United States Patent
Baker et al.

(10) Patent No.: US 6,630,011 B1
(45) Date of Patent: Oct. 7, 2003

(54) NITROGEN REMOVAL FROM NATURAL GAS USING TWO TYPES OF MEMBRANES

(75) Inventors: Richard W. Baker, Palo Alto, CA (US); Kaaeid A. Lokhandwala, Fremont, CA (US); Johannes G. Wijmans, Menlo Park, CA (US); Andre R. Da Costa, Menlo Park, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 10/245,904

(22) Filed: Sep. 17, 2002

(51) Int. Cl.[7] ............................................... B01D 53/22
(52) U.S. Cl. ............................................... 95/47; 95/50
(58) Field of Search ................................ 95/47, 50, 51

(56) References Cited

U.S. PATENT DOCUMENTS

| | | | |
|---|---|---|---|
| 3,616,607 A | 11/1971 | Klass et al. ................ 55/16 |
| 4,386,944 A * | 6/1983 | Kimura ...................... 95/51 |
| 4,435,191 A * | 3/1984 | Graham ...................... 95/51 |
| 4,597,777 A * | 7/1986 | Graham ...................... 95/51 |
| 4,894,068 A * | 1/1990 | Rice .......................... 95/51 |
| 5,042,992 A * | 8/1991 | Blinka et al. ............... 95/51 |
| 5,051,114 A | 9/1991 | Nemser et al. .............. 55/16 |
| 5,071,451 A | 12/1991 | Wijmans ..................... 55/16 |
| 5,281,255 A | 1/1994 | Toy et al. .................... 95/50 |
| 5,482,539 A * | 1/1996 | Callahan ..................... 95/51 |
| 5,647,227 A | 7/1997 | Lokhandwala ............... 62/624 |
| 5,669,958 A | 9/1997 | Baker et al. ................. 95/50 |
| 5,707,423 A | 1/1998 | Pinnau et al. ................ 95/45 |
| 5,879,431 A * | 3/1999 | Baker et al. ................. 95/50 |
| 5,964,923 A * | 10/1999 | Lokhandwala ................ 95/50 |
| 6,035,641 A * | 3/2000 | Lokhandwala ............... 60/649 |
| 6,096,114 A * | 8/2000 | Li et al. ..................... 95/47 |
| 6,168,649 B1 * | 1/2001 | Jensvold et al. .............. 95/47 |
| 6,221,131 B1 * | 4/2001 | Behling et al. ............... 95/50 |
| 6,361,582 B1 | 3/2002 | Pinnau et al. ................ 95/45 |
| 6,361,583 B1 | 3/2002 | Pinnau et al. ................ 95/45 |
| 6,425,267 B1 | 7/2002 | Baker et al. ................ 62/624 |
| 6,428,606 B1 * | 8/2002 | Gottschlich et al. .......... 95/50 |

OTHER PUBLICATIONS

Hirayama et al., "Relation of Gas Permeability with Structure of Aromatic Polyimides–I," J. Memb. Sci., 111, 169, 1996.

Tanaka et al., "Permeability and Permselectivity of Gases in Fluorinated and Non–Fluorinated Polyimides," Polymer, vol. 33, p 585, 1992.

Ando et al., "Perfluorinated Polymers for Optical Waveguides," Chemtech, Dec. 1994.

Kim et al., "Relationship Between Gas Separation Properties and Chemical Structure in a Series of Aromatic Polyimides," J. Memb. Sci., Vol 37, p 45, 1988.

\* cited by examiner

*Primary Examiner*—Robert H. Spitzer
(74) *Attorney, Agent, or Firm*—J. Farrant

(57) ABSTRACT

A process for treating natural gas or other methane-rich gas to remove excess nitrogen. The invention relies on two-stage membrane separation, using methane-selective membranes for the first stage and nitrogen-selective membranes for the second stage. The process enables the nitrogen content of the gas to be substantially reduced, without requiring the membranes to be operated at very low temperatures.

35 Claims, 5 Drawing Sheets

NITROGEN REMOVAL FROM NATURAL GAS USING TWO TYPES OF MEMBRANES

This invention was made in part with Government support under SBIR award number DE-FG03-01ER83274 awarded by the Department of Energy. The Government has certain rights in this invention.

FIELD OF THE INVENTION

The invention relates to the treatment of nitrogen-laden natural gas. More particularly, the invention relates to the removal of nitrogen from such natural gas by means of gas-separation membranes.

BACKGROUND OF THE INVENTION

Fourteen percent of known U.S. natural gas reserves contain more than 4% nitrogen. Many of these reserves cannot be exploited because no economical technology for removing the nitrogen exists.

Cryogenic distillation is the only process that has been used to date on any scale to remove nitrogen from natural gas. The gas streams that have been treated by cryogenic distillation, for example streams from enhanced oil recovery, have large flow rates and high nitrogen concentration, such as more than 10 vol %. Cryogenic plants can be cost-effective in these applications because all the separated products have value. The propane, butane and heavier hydrocarbons can be recovered as natural gas liquids (NGL), the methane/ethane stream can be delivered to the gas pipeline and the nitrogen can be reinjected into the formation.

Cryogenic plants are not used more widely because they are costly and complicated. A particular complication is the need for significant pretreatment to remove water vapor, carbon dioxide and $C_{3+}$ hydrocarbons and aromatics to avoid freezing of these components in the cryogenic section of the plant, which typically operates at temperatures down to $-150°$ C. The degree of pretreatment is often far more elaborate and the demands placed upon it are far more stringent than would be required to render the gas acceptable in the pipeline absent the excess nitrogen content. For example, pipeline specification for water vapor is generally about 120 ppm; to be fit to enter a cryogenic plant, the gas must contain no more than 1–2 ppm of water vapor at most. Similarly, 2% carbon dioxide content may pass muster in the pipeline, whereas carbon dioxide must be present at levels no higher than about 100 ppm for cryogenic separation. For streams of flow rates less than about 50–100 MMscfd, therefore, cryogenic technology is simply too expensive and impractical for use.

Other processes that have been considered for performing this separation include pressure swing adsorption and lean oil absorption; none is believed to be in regular industrial use.

Gas separation by means of membranes is known. For example, numerous patents describe membranes and membrane processes for separating oxygen or nitrogen from air, hydrogen from various gas streams and carbon dioxide from natural gas. Such processes are in industrial use, using glassy polymeric membranes. Rubbery polymeric membranes are used to separate volatile organic compounds from air or other gas mixtures.

An application that is very difficult for membranes is the separation of nitrogen from methane. Both glassy and rubbery membranes have very poor selectivities, typically of 3 or less, for nitrogen over methane or methane over nitrogen.

U.S. Pat. No. 3,616,607 to Northern Natural Gas Company, discloses membrane-based separation of nitrogen from methane for natural gas treatment, using nitrogen-selective membranes. The patent reports extraordinarily high nitrogen/methane selectivities up to 15 and 16. These numbers are believed to be erroneous and have not been confirmed elsewhere in the literature. Also, the membranes with these alleged selectivities were made from polyacrylonitrile, a material with extremely low gas permeability of the order $10^{-4}$ Barrer (ten thousandths of a Barrer) that would be impossible to use for a real process.

It was discovered a few years ago that operating silicone rubber membranes at low temperatures can increase the methane/nitrogen selectivity to as high as 5, 6 or above. U.S. Pat. Nos. 5,669,958 and 5,647,227 make use of this discovery and disclose low-temperature methane/nitrogen separation processes using silicone rubber or similar membranes to preferentially permeate methane and reject nitrogen. However, such a selectivity is obtained only at very low temperatures, typically $-60°$ C., for example. Temperatures this low generally cannot be reached by relying on the Joule-Thomson effect to cool the membrane permeate and residue streams, but necessitate additional chilling by means of external refrigeration. While such processes may be workable in industrial facilities with ready access to refrigeration plants, they are impractical in many gas fields, where equipment must be simple, robust and able to function for long periods without operator attention.

Another problem of very low temperature operation is that, even though the membranes themselves may withstand the presence of liquid water and hydrocarbons, considerable pretreatment is often necessary to avoid damage to ancillary equipment by condensed liquids. Streams must also be dried to a very low water content to prevent the formation of methane or other hydrocarbon hydrates that can clog the system.

U.S. Pat. Nos. 6,361,582 and 6,361,583, co-owned with the present application, describe processes for separating gases such as nitrogen from $C_{3+}$ hydrocarbons. The processes make use of membranes made from certain fluorinated polymers that are resistant to plasticization by hydrocarbons. U.S. patent application Ser. No. 10/100,459, entitled "Nitrogen Gas Separation Using Organic-Vapor-Resistant Membranes" and co-owned and copending with the present application, describes processes for separating nitrogen from gas mixtures such as natural gas using the same type of fluorinated membranes.

U.S. patent application Ser. No. 10/105,861, entitled "Gas Separation Using Organic-Vapor-Resistant Membranes in Conjunction with Organic-Vapor-Selective Membranes" and co-owned and copending with the present application, describes processes for separating gas mixtures, such as nitrogen-containing natural gas, by means of flow schemes that use combinations of rubbery and glassy membranes.

U.S. Pat. No. 6,425,267, co-owned with the present application, describes processes for removing nitrogen from natural gas using a two-step arrangement of nitrogen-rejecting membranes.

U.S. patent application Ser. No. 10/035,404, entitled "Natural Gas Separation using Nitrogen-Selective Membranes" and Ser. No. 10/033,680, entitled "Natural Gas Separation using Nitrogen-Selective Membranes of Modest Selectivity", both co-owned and copending with the present application, describe processes for separating nitrogen from natural gas using only glassy, nitrogen-selective membranes.

There remains a need for improvements to the above-described processes, especially for treating gas streams containing relatively high concentrations of nitrogen, or those where the composition varies over time.

SUMMARY OF THE INVENTION

The invention is a process for treating natural gas or other methane-containing gas to remove excess nitrogen.

It is envisaged that the process will be particularly useful as part of a natural gas processing train. Pipeline specification for natural gas is usually no more than about 4% nitrogen, but raw gas frequently contains more than 4% nitrogen and not infrequently contains 10% nitrogen, 20% nitrogen or more. The process of the invention frequently enables gas that is out of specification with respect to nitrogen to be brought to pipeline specification. Gas streams associated with oil wells, landfill gas, coal-seam gas and the like fall within this general type of treatable gas stream.

Other application areas where the process is expected to be useful include, but are not limited to, treatment of off-gases from petrochemical manufacturing and other industrial processes.

The invention relies on membrane separation using a combination of methane-selective membranes and nitrogen-selective membranes. Specifically, the process in preferred form uses three membrane separation units, configured as a two-step, two-stage operation, as defined below. The first and second steps of the first stage use methane-selective membranes, and the second stage uses nitrogen-selective membranes.

In a basic embodiment, the process of the invention includes the following steps:

(a) providing a first membrane unit containing a first membrane having a first feed side and a first permeate side, the first membrane being more permeable to methane than to nitrogen;

(b) providing a second membrane unit containing a second membrane having a second feed side and a second permeate side, the second membrane being more permeable to methane than to nitrogen, the second membrane unit being connected in series with the first membrane unit such that gas leaving the first feed side can enter the second membrane unit on the second feed side;

(c) providing a third membrane unit containing a third membrane having a third feed side and a third permeate side, the third membrane being more permeable to nitrogen than to methane, the third membrane unit being connected in series with the first membrane unit such that gas leaving the first permeate side can enter the third membrane unit on the third feed side;

(c) passing a gas stream, comprising methane and at least about 4% nitrogen, at a first pressure, into the first membrane unit at a first inlet of the first feed side;

(d) withdrawing from a first outlet of the first feed side a first residue stream enriched in nitrogen compared with the gas stream;

(e) withdrawing from the first permeate side, at a second pressure lower than the first pressure, a first permeate stream depleted in nitrogen compared with the gas stream;

(f) passing the first residue stream into the second membrane unit at a second inlet of the second feed side;

(g) withdrawing from a second outlet of the second feed side a second residue stream enriched in nitrogen compared with the first residue stream;

(h) withdrawing from the second permeate side, at a third pressure lower than the first pressure, a second permeate stream depleted in nitrogen compared with the first residue stream;

(i) passing the first permeate stream, at a fourth pressure, into the third membrane unit at a third inlet of the third feed side;

(g) withdrawing from a third outlet of the third feed side a third residue stream depleted in nitrogen compared with the first permeate stream;

(h) withdrawing from the third permeate side, at a fifth pressure lower than the fourth pressure, a third permeate stream enriched in nitrogen compared with the first permeate stream.

The third residue stream is usually the principal product stream of the process, and the process can usually be configured so that this stream meets pipeline specification or other target specification for nitrogen.

Preferred embodiments of the invention include recirculating the third permeate stream to the front of the process to increase methane recovery.

Also preferred, depending on the feed gas composition, is either recirculating the second permeate stream to the front of the process or withdrawing the second permeate stream as a second product stream of value.

If the second and third permeate streams are both fully recirculated, the process produces two product streams—the third residue stream, with a nitrogen content reduced to the target level, and the nitrogen-rich second residue stream. In this case, this stream may be used in whole or in part as fuel to run field engines, turbines or the like.

If the raw gas stream is very heavily contaminated with nitrogen, such as may occur when treating gases generated by nitrogen injection, the process may be used to produce three product streams by withdrawing, rather than recirculating, a portion or all of the second permeate stream. In this case, the third residue stream, as before, is the methane-rich, nitrogen-depleted product stream, the second permeate stream provides fuel gas, and the second residue stream contains a high concentration of nitrogen, and may be suitable for further use as injection gas.

By adopting one of these preferred embodiments, the fuel to run any compressor needed for the process can be generated as a discrete product stream by the process itself. This is very beneficial as gas-fired compressors can operate in remote locations where an electrical power supply is unavailable.

The process of the invention offers a number of additional features and advantages. Most importantly, it enables natural gas containing relatively large amounts of nitrogen, such as 10%, 20% or higher, to be treated economically to reduce the nitrogen content to a target value, such as 8% nitrogen, 6% nitrogen or less. Frequently, it is possible to bring the stream close to or within pipeline specification of no more than 4% nitrogen. Furthermore, for small gas streams or remote gas fields, these results can be achieved more simply, reliably and cheaply than could be done with prior art technology.

Also, unlike the prior art membrane processes disclosed in U.S. Pat. Nos. 5,669,958 and 5,647,227, it is not necessary to operate the methane-selective membrane separation steps under conditions of such low temperature as to yield a methane/nitrogen selectivity of at least 5. The two-step, two-stage membrane process configuration provides adequate performance, in terms of low product nitrogen content combined with good methane recovery, even when the membrane selectivity is as low as 2, 3 or 4, for example.

The nitrogen-selective materials used for the second stage also have numerically low nitrogen/methane selectivity, typically of only about 2 or 3, becoming more selective for nitrogen over methane as the operating temperature declines. However, again the specific configuration provided herein enables the nitrogen-selective stage to be operated to yield satisfactory results without having to resort to extremely low temperatures.

In general, sufficient cooling to produce adequate selectivity in both stages can, therefore, be provided simply by taking advantage of the cooling by Joule-Thomson effect of both permeate and residue streams that takes place in membrane separation processes.

Such cooling can be accomplished by heat exchange between the membrane feed, residue and permeate streams, and optionally by expanding the membrane residue streams before such heat exchange, without the need for any external refrigeration source. In general, the process can be operated at temperatures above −40° C., and of ten much higher, such as above −30° C., above −25° C., above −10° C. or even around 0° C. or above. The ability to function at these comparatively high temperatures and without external cooling in many instances is a particular advantage of the present invention, as it greatly simplifies the process compared with prior art technologies.

Furthermore, very high pressures are not needed for good performance. In general, feed gas pressures in the range between about 400 psia and 1,500 psia can be used.

If desired, the process can be operated so as to keep the average temperatures of the membrane separation units and incoming and outgoing streams above about −25° C. In this case, metal components of the equipment can be made from carbon steel rather than stainless steel, with considerable cost savings.

The invention is particularly useful for treating gas streams that arise as a result of nitrogen injection processes. Traditional oil-production techniques recover as little as 25–35% of the oil in a typical field. Recovery is improved by injecting carbon dioxide into the reservoir at the periphery. The gas dissolves in the remaining oil and lowers its viscosity, enabling it to be pushed more readily to the extraction wells. High-pressure nitrogen is also injected into gas fields to drive the gas to the wells, as well as to recover methane from coal bed methane reservoirs. The overall economics of such processes are dependent on the costs of the nitrogen injectant, which of ten has to be supplied from a cryogenic plant on site or a similarly costly source. A cost-effective process able to recover nitrogen at a composition suitable for reinjection makes these types of processes more efficient and attractive. The invention can provide such processes.

Many natural gas streams contain excess carbon dioxide. The processes of the invention are also well suited for removing carbon dioxide from the raw gas stream, and may of ten be configured to bring the product gas stream into specification for both carbon dioxide and nitrogen.

In some instances, such as when the raw gas is less heavily contaminated with nitrogen, it may be possible to achieve acceptable results using only a single membrane separation step in the first stage. In this embodiment, the process of the invention includes the following steps:

(a) providing a first membrane unit containing a first membrane having a first feed side and a first permeate side, the first membrane being more permeable to methane than to nitrogen;

(b) providing a second membrane unit containing a second membrane having a second feed side and a second permeate side, the second membrane being more permeable to nitrogen than to methane, the second membrane unit being connected in series with the first membrane unit such that gas leaving the first permeate side can enter the second membrane unit on the second feed side;

(c) passing a gas stream, comprising methane and at least about 4% nitrogen, at a first pressure, into the first membrane unit at a first inlet of the first feed side;

(d) withdrawing from a first outlet of the first feed side a first residue stream enriched in nitrogen compared with the gas stream;

(e) withdrawing from the first permeate side, at a second pressure lower than the first pressure, a first permeate stream depleted in nitrogen compared with the gas stream;

(f) passing the first permeate stream, at a third pressure, into the second membrane unit at a second inlet of the second feed side;

(g) withdrawing from a second outlet of the second feed side a second residue stream depleted in nitrogen compared with the first permeate stream;

(h) withdrawing from the second permeate side, at a fourth pressure lower than the third pressure, a second permeate stream enriched in nitrogen compared with the first permeate stream.

The invention is also particularly useful for treating nitrogen-contaminated natural gas where the composition of the gas changes over time. In many natural gas production processes, the concentration of nitrogen in the raw gas slowly increases. A two-step process using only membranes selective for methane over nitrogen may be able, initially, to produce a permeate from the first membrane separation step that is sufficiently depleted in nitrogen to meet target specifications. As time goes on, however, it becomes increasingly difficult to reduce the permeate nitrogen content to the target level. The use of a nitrogen-selective second stage to polish the gas overcomes this difficulty.

It is an object of the invention to provide a process for removing excess nitrogen from methane/nitrogen gas mixtures.

Other objects and advantages will be apparent from the description of the invention to those skilled in the gas separation arts.

DETAILED DESCRIPTION OF THE INVENTION

The terms gas and vapor are used interchangeably herein.

The term $C_{2+}$ hydrocarbon means a hydrocarbon having at least two carbon atoms; the term $C_{3+}$ hydrocarbon means a hydrocarbon having at least three carbon atoms, and so on.

The term heavier hydrocarbons means $C_{3+}$ hydrocarbons.

The term light hydrocarbons means $C_1$–$C_6$ hydrocarbons.

The terms two-step and multistep as used herein with regard to a membrane separation unit mean an arrangement of membrane modules or banks of membrane modules connected together such that the residue stream from one module or bank of modules becomes the feedstream for the next.

The terms two-stage and multistage as used herein with regard to a membrane separation unit mean an arrangement of membrane modules or banks of membrane modules connected together such that the permeate stream from one module or bank of modules becomes the feedstream for the next.

Percentages herein are by volume unless otherwise stated.

The invention is a membrane separation process for treating a gas stream containing methane and nitrogen, and particularly for removing excess nitrogen from natural gas, such as arises from gas wells, oil wells, including wells employing nitrogen for enhanced oil recovery, landfills and the like.

Figure 1:
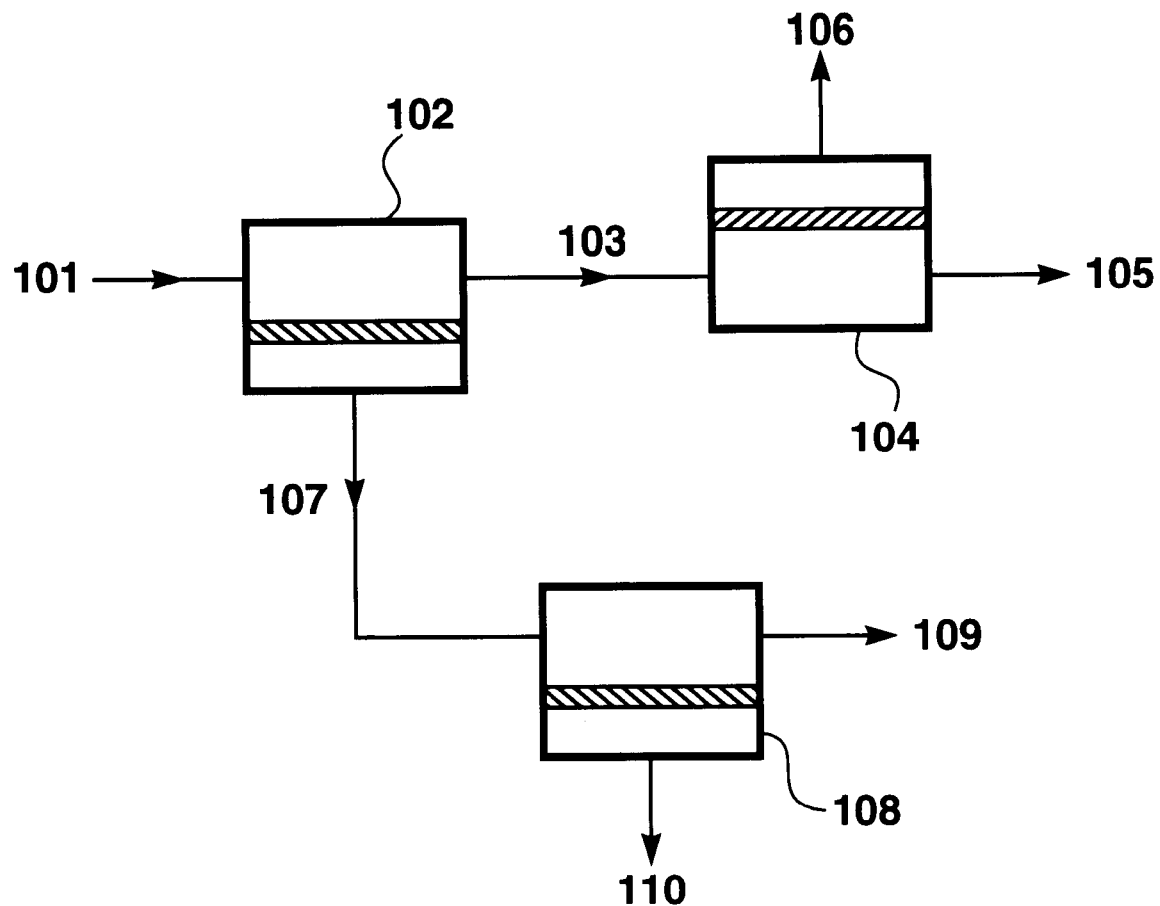
FIG. 1 is a schematic drawing of a basic embodiment of the invention.

In its most basic aspect, the invention involves running a gas stream that is out of specification with respect to nitrogen through three banks of membrane modules arranged in a two-step, two-stage configuration, as shown schematically in FIG. 1.

The process as shown may be carried out at individual wellheads or on pooled gas at intermediate stations or central gas-processing facilities. It will be appreciated by those of skill in the art that this and the other figures are very simple schematic diagrams, intended to make clear the key aspects of the invention, and that an actual process train will usually include many additional components of a standard type, such as heaters, chillers, condensers, pumps, blowers, other types of separation and/or fractionation equipment, valves, switches, controllers, pressure-, temperature-, level- and flow-measuring devices and the like.

Turning specifically to FIG. 1, stream, 101, may be any natural gas, or indeed any methane-containing gas, from which it is desired to remove nitrogen. The gas may be from a natural gas well, may be associated gas produced in conjunction with oil, either spontaneously or as a result of nitrogen injection for enhanced oil recovery, may be gas gathered from a landfill, or coal seam, or may arise from any other source. As discussed in the Summary of the Invention section above, the invention is particularly useful for treating gas streams that arise as a result of nitrogen injection processes.

Stream 101 may be as-extracted from the ground or may have been subjected to pretreatment of any kind, including, but not limited to, filtration to remove particulates, entrained water or hydrocarbon liquids, separation by any means, including, but not limited to absorption, adsorption, condensation and membrane separation, of gaseous contaminants, such as acid gases, $C_{3+}$ hydrocarbon vapors or water vapor, and other membrane or non-membrane separation of methane and nitrogen. Stream 101 may be at any pressure, but is typically at above atmospheric pressure, in the hundreds of psia range.

The standard natural gas pipeline specification for inert gas content is less than 4%, so stream 101 will usually contain at least about 4% nitrogen, and frequently will contain considerably more nitrogen, such as at least about 10%, 15% nitrogen, 20% nitrogen or more. The process of the invention can be applied to streams of any nitrogen concentration in principle, but is generally particularly well suited for handling gas that contains relatively large amounts of nitrogen, such as more than about 15% nitrogen. Most preferably, stream 101 should contain between about 15% and 30% nitrogen.

The other most significant component of stream 101 is methane, usually the major component, and the stream may typically contain a number of other components, most commonly water vapor, ethane, $C_{3+}$ hydrocarbons, carbon dioxide, hydrogen sulfide and other inert gases such as helium and argon.

As mentioned above, stream 101 is typically at elevated pressure. If it is at insufficiently high pressure to operate the process satisfactorily, stream 101 may optionally be compressed, as discussed in more detail with respect to the specific preferred embodiments.

Stream 101 is introduced into the feed side of first membrane separation step 102. The goal of this step is to produce a permeate stream, 107, having a substantially reduced nitrogen content compared with the feed stream.

The first membrane separation step relies on membranes that are selective in favor of methane over nitrogen. A synthetic polymer membrane separates the components of a gas or vapor mixture because the components permeate the membrane at different rates. The permeability, P [cm³(STP) ·cm/cm²·s·cmHg], of a polymer membrane material for a gas is defined as the rate at which that gas moves through a standard thickness [1 cm] of the material under a standard driving force [a pressure difference of 1 cmHg].

A measure of the ability of a membrane to separate two gases is the selectivity, α, defined as the ratio of the gas permeabilities, $P_1/P_2$. Selectivity can also be expressed as:

$$\alpha = D_1/D_2 \cdot k_1/k_2$$

where D is the diffusion coefficient of the gas in the membrane [cm²/s], which is a measure of the gas mobility, and k is the Henry's law sorption coefficient, which links the concentration of the gas in the membrane material to the pressure in the adjacent gas [cm³(STP)/cm³·cmHg].

The intrinsic selectivity of a polymer material is established by measuring the permeabilities with pure gas or vapor samples, then calculating the ratio. The actual selectivity obtained in a real separation process is established by making permeation measurements with gas mixtures.

The ratio $D_1/D_2$ is the ratio of the diffusion coefficients of the two gases and can be viewed as the mobility selectivity, reflecting the different sizes of the two molecules. The ratio $k_1/k_2$ is the ratio of the Henry's law solubility coefficients of the two gases and can be viewed as the solubility selectivity, reflecting the relative condensabilities of the two gases.

In all polymer materials, the diffusion coefficient decreases with increasing molecular size. Hence, the mobility component of the selectivity always favors the passage of small molecules over large ones. The solubility component of the selectivity, on the other hand, is a measure of the energy required for sorption, and normally increases with molecular diameter, because larger molecules are normally more condensable than smaller ones. The combined effect of these two factors determines the selectivity of the membrane.

The balance between mobility selectivity and solubility selectivity is different for glassy and rubbery polymers. In glassy polymers, the diffusion term is usually dominant, permeability falls with increasing permeant size and the material is selective for small molecules over large ones. In rubbery polymers, the solubility term is usually dominant, permeability increases with increasing permeant size and the material is selective for large molecules over smaller ones.

Elastomeric materials, therefore, tend to permeate larger, condensable molecules faster than small, low-boiling molecules. Thus, most rubbery materials are selective in favor of all $C_{3+}$ hydrocarbons over low-boiling point gases. Examples of polymers that can be used to make such elastomeric membranes, include, but are not limited to, nitrile rubber, neoprene, polydimethylsiloxane and related silicone polymers, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, polyamide-polyether block copolymers, styrene/butadiene/styrene block copolymers, styrene/ethylene/butylene block copolymers, and thermoplastic polyolefin elastomers.

The molecular kinetic diameters of nitrogen (3.64 A) and methane (3.8 A) are similar, and methane has a critical temperature of −82.6° C., so is only moderately more soluble than nitrogen in most polymer materials. The slightly smaller molecular size of nitrogen means that glassy materials slightly favor the passage of nitrogen over methane. The relative condensability of methane means that rubbery materials slightly favor the passage of methane over nitrogen. As a result of the similar molecular sizes and the poor condensability of both components, however, both glassy and rubbery membrane materials have poor selectivity for this gas pair, as was mentioned above.

In rubbery membrane materials such as silicone rubbers, the diffusion coefficients decrease with decreasing temperature, but sorption coefficients increase. As disclosed in U.S. Pat. No. 5,669,958, this results in certain rubbery polymers exhibiting a surprisingly good increase in selectivity with decreasing temperature. Therefore, the preferred membranes for use in membrane separation step 102 are those in which the selective layer is made from such materials. A particularly preferred material is polydimethylsiloxane. Other preferred materials with similar properties are poly(siloctylene-siloxane) and poly(p-silphenylene-siloxane).

As can be seen from the brief explanation of the solution/diffusion transport mechanism above, it is important that the material to be used remains rubbery under the temperature conditions at which it is used. Thus, the selected material should have a glass transition temperature at least about 20–30° C. below the lowest operating temperature to which the membranes are likely to be exposed. Glass transition temperatures for some suitable polysiloxanes are given in U.S. Pat. No. 5,669,958. Glass transition temperatures for many rubbery polymers may be found in *Polymer Handbook*. J. Brandrup and E. H. Immergut (eds.), Second edition, Wiley Interscience, 1975.

U.S. Pat. No. 5,669,958 indicates that polyamide-polyether block copolymers are not suitable for use as methane/nitrogen separation membranes at low temperature, because the polymer rapidly becomes more glassy in behavior as the temperature falls below about −20° C. (see Example 7 and FIG. 9 of '958), and the required methane/nitrogen selectivity of 5 is never attained. However, since the present process can be operated at lower methane/nitrogen selectivity, for example at a selectivity of 2 or 3, it can be seen that at least some grades of polyamide-polyether block copolymers are able to provide adequate selectivity, even at low temperatures, and are, therefore, usable as membrane materials for the invention.

As a less preferred alternative, super-glassy materials, which are also known to be selective for more condensable over less condensable components in a gas mixture, may be used. Such materials and membranes made from them are described in U.S. Pat. Nos. 5,281,255 and 5,707,423, for example.

The membrane may take any convenient form known in the art. Usually, rubbery materials do not have enough mechanical strength to be formed as unsupported membranes. Therefore, preferred embodiments incorporating rubbery selective materials involve the use of a composite membrane comprising a microporous support, onto which the rubbery selective layer is deposited as a thin coating. The preparation of such membranes is well known in the membrane-making art. The preferred form is a composite membrane including a microporous support layer for mechanical strength and a rubbery polymeric coating layer, most preferably silicone rubber, that is responsible for the separation properties. Additional layers may be included in the structure as desired, such as to provide strength, protect the selective layer from abrasion, and so on.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice. Since conventional polymeric materials are preferred for the membranes, they are relatively easy and inexpensive to prepare and to house in modules, compared with other types of membranes that might be used as organic-selective membranes, such as finely microporous inorganic membranes, including adsorbent carbon membranes, pyrolysed carbon membranes and ceramic membranes.

Whatever their composition and structure, the membranes should preferably have a selectivity for methane over nitrogen of at least about 2, and more preferably at least about 3 or 4. As taught in U.S. Pat. No. 5,669,958, and shown in the Examples section below, the selectivity of silicone rubber membranes for methane over nitrogen increases from about 2.5 at about 20° C. to about 3.3 at about 0° C., to about 4 at about −20° C., and to about 5 at −60° C.

In the present invention, it is not necessary to achieve a selectivity of 5 for a useful process. Hence, it is not necessary to operate the membrane separation steps at such low temperatures (although, of course, if low temperatures can conveniently and economically be provided, the membrane separation capability will be correspondingly enhanced). Thus, the preferred operating temperature for step 102 is above about −40° C., more preferably above −25° C., and most preferably above −10° C. or even above 0° C. In terms of ranges, the preferred operating temperature is between about 40° C. and −40° C., more preferably between about 25° C. and −25° C., and most preferably between about 10° C. and −10° C.

Since the Joule-Thomson effect promotes cooling of both the permeate and residue streams as gas travels through the membrane modules, the average temperature within a membrane module in the present separations is typically lower than the temperature at the inlet of the feed gas. Feed stream 101 can frequently be brought to an appropriate temperature for introducing into the feed side inlet that is within or a little above the above-specified preferred temperature ranges by heat exchange against permeate stream 106 and/or 107, and/or other residue or permeate streams. For example, additional cooling of stream 101 may be provided by heat exchange against stream 105, which may optionally be further lowered in temperature by, for example, running through a turbo-expander, as is well known in the art. Less preferably, external refrigeration using propane or similar refrigerants may be used.

In almost all cases, it is possible to provide ample cooling of the incoming feed stream simply by heat exchange against one or more of the residue and permeate streams of the process. In these instances, the process relies for cooling entirely on the Joule-Thomson expansion of gas across the membranes. Thus no additional cooling energy need be supplied in any form.

A driving force for transmembrane permeation is provided by a pressure difference between the feed and permeate sides of the membrane. The transmembrane flux of a permeating component is proportional to the partial pressure difference, $\Delta p$, between the feed partial pressure and permeate partial pressure of that component. The rubbery membrane materials preferred for methane/nitrogen separation are very permeable compared to many membrane materials, so a very large $\Delta p$ driving force is not required to obtain adequate flux. Typically a pressure difference in the hundreds of psi range, such as between about 200 psi and 1,500 psi is appropriate.

To provide a pressure difference in this range, feed gas pressures in the range about 400 psia to about 1,800 psia are generally preferred. If the raw gas stream is not at sufficiently high pressure, it may be compressed, as described in more detail below.

The pressure on the permeate side may be set to any desired value. Since the gas leaving the permeate side of membrane step 102 will be subjected to further membrane separation, it is preferred to maintain a permeate-side pressure substantially above atmospheric pressure. By substantially above atmospheric pressure, we mean at least about 25 psia, more preferably at least about 50 psia or at least about 100 psia, and most preferably at least about 200 psia.

A second consideration in selecting permeate pressure is the ratio feed pressure/permeate pressure, known as the pressure ratio. The mathematical relationship between pressure ratio and selectivity is a complicated expression. (This expression is derived, for example, in Chapter 8 of *Membrane Technology and Applications*, R. W. Baker, McGraw Hill, 2000).

If the numerical value of the pressure ratio, $\phi$, is much larger than the numerical value of the selectivity, $\alpha$, then the process operates in the selectivity-limited region, and the permeate concentration is essentially independent of the pressure ratio and is determined by the selectivity. In this region, a membrane separation process can take advantage of the full intrinsic separating power of the membrane, and, assuming a given feed composition, the higher the selectivity, the better the separation performance will be.

At the other extreme, if the numerical value of the pressure ratio is much smaller than the selectivity, then the process operates in the pressure-ratio-limited region, and the permeate concentration is essentially independent of the membrane selectivity and is determined by the pressure ratio.

Between these extremes, where pressure ratio and selectivity are of about the same order of magnitude, separation performance is affected by both.

Since the selectivity of the membranes of step 102 is usually numerically low, such as 2 or 3, there is no benefit to operating at high pressure ratios greater than about 10 or 15, since the separation is primarily selectivity limited so long as the pressure ratio is greater than about 5 or 10. Thus the preferred feed and permeate pressure combinations are such as to give a pressure ratio generally in the range between about 3 and 10.

The transmembrane pressure-normalized methane flux provided by the membranes should be at least about 1 gpu ($1\times10^{-6}$ cm$^3$(STP)/cm$^2\cdot$s$\cdot$cmHg), more preferably at least about 50 gpu and most preferably at least about 100 gpu.

To achieve fluxes of these orders, the selective layer responsible for the membrane separation properties should be thin, preferably, but not necessarily, no more than 20 $\mu$m thick, more preferably no more than 10 $\mu$m thick, and most preferably no more than about 5 $\mu$m thick.

Membrane separation step 102 results in a first residue stream, 103, that is enriched in nitrogen and depleted in methane compared with the membrane feed stream, 101, and a first permeate stream, 107, that is enriched in methane and depleted in nitrogen compared with the membrane feed stream 101.

First residue stream 103 is withdrawn from the outlet of the first membrane separation step feed side and passed as feed to the feed side inlet of the second membrane separation step 104. Stream 103 will normally be at essentially the same pressure as stream 101, subject only to any small pressure drop that occurs along the length of the membrane modules in step 102. In a properly designed gas separation system, this drop should be no more than a few psi. Thus, recompression, though not excluded from the process, is not generally required before stream 103 enters step 104. The membranes used in this step are also selective for methane over nitrogen, and are typically, although not necessarily, made from the same membrane materials as the membranes of step 102.

Owing to Joule-Thomson cooling effects in step 102, the feed gas cools as it passes down the module and first residue stream 103 is usually quite cold, such as 5° C., 0° C. or below; this stream, therefore, can normally pass as feed into step 104 without any additional cooling by heat exchange or external cooling. Light hydrocarbons ($C_2$–$C_6$ hydrocarbons) will always be present in feed stream 101 to some extent. In general, the higher the concentration of such hydrocarbons in the feed gas, the greater will be the cooling produced by Joule-Thomson expansion, and the lower will be the resulting temperature of streams 103 and 107. In some cases, it may be desirable to allow stream 103 to warm after leaving the first membrane step and before entering the second membrane step, to keep the operating temperature of step 104 within the preferred range.

The considerations concerning membrane type, selectivity, pressure ratio, pressure difference, and so on, in step 104 are similar to those for step 102. Thus, the step: (i) can be operated at comparatively low methane/nitrogen selectivity, such as about 2, 3 or 4, and, therefore, at comparatively high temperatures, such as above about −40° C., −30° C. or −20° C.; (ii) should preferably operate at a feed pressure between about 400 psia and 1,800 psia; (iii) should operate at a permeate pressure above atmospheric pressure, preferably above about 25 psia, and more preferably above about 50 psia, 100 psia or higher; and (iv) preferably should provide a pressure ratio in the range about 3–10.

By selectively retaining nitrogen, membrane separation step 104 results in a second residue stream, 105, that is enriched in nitrogen and depleted in methane compared with the membrane feed stream, 103, and a second permeate stream, 106, that is enriched in methane and depleted in nitrogen compared with the membrane feed stream 103.

Residue stream 105 represents gas that has been twice enriched in nitrogen and, therefore, typically contains a relatively high concentration of nitrogen, such as about 30% nitrogen, 40% nitrogen, 50% nitrogen or even higher, depending on the amount of nitrogen in the raw gas, and the operating parameters of steps 102 and 104.

As described above, the invention is particularly useful for treating gas streams that arise as a result of nitrogen injection processes. In this case, stream 105, which is the most nitrogen-rich stream produced by the process of FIG. 1, may contain as much as 50% nitrogen, 60% nitrogen, 70% nitrogen or more. This high-pressure, nitrogen-rich stream can optionally be injected as a substitute for, or a supplement to, fresh nitrogen. The attendant savings in complexity of operations and cost of production are expected to be beneficial.

A second exemplary use of stream 105, in whole or part, is as fuel gas. In a gas field, a significant amount of gas is required as engine fuel to drive compressors and other equipment used during gas gathering and processing operations. In fields where turbines are operated, such as for electric power generation, turbine fuel is also needed.

Such field equipment is often powered by piston engines, which can operate with fuel of comparatively low Btu value, as low as about 700 Btu, and sometimes even lower. In many cases, stream 105 will meet the compositional and Btu requirements for a fuel product and may be used, in whole or in part, to drive field engines.

If the process cannot be configured so that stream 105 yields a fuel gas product meeting such requirements, yet another option is to mix stream 105 with a small amount of gas from stream 101 or another process stream to produce an acceptable fuel.

If stream 105 is not needed for reinjection, fuel gas or other purpose, it may simply be withdrawn from the feed side outlet of step 104 and flared or otherwise disposed of Since it is at high pressure, energy may be extracted from the stream before disposal or flaring by passing it through a turbo-expander, as is well known in the art. The expander may then be used to provide compression energy for other streams.

Permeate stream 106 from step 104 represents gas that has been once enriched in nitrogen (in step 102) and once depleted in nitrogen (in step 104). Typically, therefore, stream 106 has a nitrogen concentration of about the same order as that of the feed stream 101, that is, it still contains significant quantities of methane. In many cases, therefore, it is preferred to recirculate stream 106 to the front of the process, as described in more detail with respect to FIG. 2. In this way, methane in stream 106 is not lost.

However, other destinations for stream 106 are within the scope of the invention and may be appropriate depending on the specific circumstances in which the process is used. For example, all or part of stream 106 may be used as engine fuel, as described above, flared or sent to other treatment processes.

Returning to membrane separation step 102, this step also results in nitrogen-depleted permeate stream, 107. The nitrogen concentration of this stream is typically reduced by between about two-fold and five-fold compared with stream 101. Thus, typical nitrogen content of stream 107 is in the range about 5–15%, more preferably between about 6% and 12%. Stream 107 is passed as feed to a second membrane separation stage, 108. Unlike the two membrane separation steps 102 and 104 of the first stage, separation stage 108 uses nitrogen-selective membranes.

Table 1 shows some representative nitrogen/methane selectivity values for various glassy polymers.

TABLE 1

| Polymer | Permeability (Barrer) | | Selectivity (–) | | Ref. |
| --- | --- | --- | --- | --- | --- |
| | $N_2$ | $CH_4$ | $N_2/CH_4$ | $CH_4/N_2$ | |
| Polyimide (6FDA-mp'ODA) | 0.26 | 0.13 | 2.1 | 0.5 | 1 |
| Polyimide (6FDA-BAHF) | 3.10 | 1.34 | 2.3 | 0.4 | 1 |
| Polyimide (6FDA-IPDA) | 1.34 | 0.70 | 1.9 | 0.5 | 2 |
| Polyimide (6FDA-MDT) | 0.40 | 0.20 | 2.0 | 0.5 | 4 |
| Polyimide (6FDA-CDM) | 0.27 | 0.12 | 2.3 | 0.4 | 4 |
| Polyimide (6FDA-HAB) | 0.17 | 0.056 | 3.0 | 0.3 | 4 |
| Polyimide (6FDA-MDA) | 0.20 | 0.10 | 2.0 | 0.5 | 2 |
| Polyimide (BPDA-MDT) | 0.048 | 0.028 | 1.7 | 0.6 | 4 |
| Polyimide (BPDA-HAB) | 0.001 | 0.0004 | 2.4 | 0.4 | 4 |
| Cellulose acetate | 0.35 | 0.43 | 0.8 | 1.2 | 3 |
| Polycarbonate | 0.37 | 0.45 | 0.8 | 1.2 | 3 |
| Polysulfone | 0.14 | 0.23 | 0.6 | 1.7 | 3 |
| Hyflon ® AD60 | 20 | 8–9 | 2.3 | 0.4 | 5 |
| Hyflon ® AD80 | 30–40 | 14–19 | 2.1 | 0.5 | 5 |
| Cytop ® | 5 | 1–2 | 2.7 | 0.4 | 5 |

1 K. Tanaka et al., "Permeability and Permselectivity of Gases in Fluorinated and Non-Fluorinated Polyimides", Polymer 33, 585 (1992).
2. T. H. Kim et al., "Relationship Between Gas Separation Properties and Chemical Structures in a Series of Aromatic Polyimides", J. Memb. Sci., 37, 45 (1988).
3. J. G. Wijmans, "Membrane Processes and Apparatus for Removing Vapors from Gas Streams", U.S. Pat. No. 5,071,451 (December 1991).
4. Y. Hirayama et al., "Relation of gas permeability with structure of aromatic polyimides I", J. Memb. Sci., 111, 169 (1996).
5. Inventors' estimates.

As can be seen, a number of glassy polymers commonly used as membrane materials are slightly selective in favor of methane over nitrogen. These obviously are unsuitable for present purposes. Another problem is that many materials have low permeability, less than 1 Barrer for nitrogen in many cases, and would require impractically large membrane areas and/or impractically thin membranes.

Nevertheless, a number of materials exist that can be used to make suitable membranes, so long as the membranes can exhibit, when in use in the process, a nitrogen/methane selectivity preferably approaching about 2, and more preferably above 2, such as at least about 2.5, or most preferably higher.

Examples of polymers that can be used to make such membranes are the most nitrogen-selective materials listed in Table 1, particularly 6FDA-based polyimides, where 6FDA is the structure:

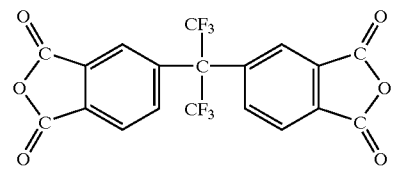

Representative 6FDA polyimides that may be considered for use in the invention include 6FDA-IPDA and 6FDA-BAHF, for example.

Another polyimide class that is believed to contain useful selective layer materials is the perfluorinated polyimides. Such materials have been investigated for use as optical waveguides, and their preparation is described, for example, in S. Ando et al., "Perfluorinated polymers for optical waveguides", CHEMTECH, December, 1994. To be usable as membrane materials, the polyimides have to be capable of being formed into continuous films. Thus, polyimides that incorporate ether or other linkages that give some flexibility to the molecular structure are preferred. Particular examples are polymers comprising repeat units prepared from the perfluorinated dianhydride 1,4-bis(3,4-dicarboxytrifluorophenoxy) tetrafluorobenzene (10FEDA), which has the structure:

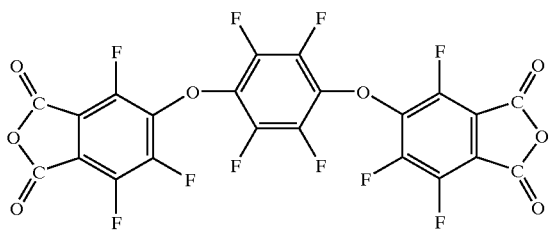

Diamines with which 10FEDA can be reacted to form polyamic acids and hence polyimides include 4FMPD, which has the structure:

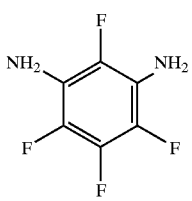

The resulting 10FEDA/4FMPD polyimide has the repeat unit structure:

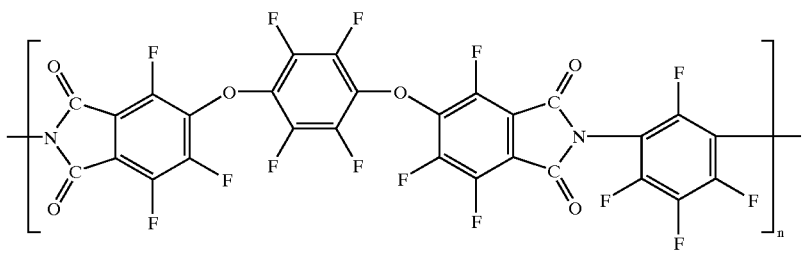

where n is a positive integer.

Another group of polymers that includes materials suitable for use is fluorinated, preferably perfluorinated, glassy polymers having a fractional free volume no greater than about 0.3 and a glass transition temperature, Tg, of at least about 100° C., in conjunction with repeat units of a fluorinated, cyclic structure, the ring having at least five members, and/or a fluorine:carbon ratio of at least 1:1.

If the polymer has a ring structure within the repeat units, the ring may be aromatic or non-aromatic, and may contain other atoms than carbon, such as oxygen atoms. Preferred polymers for the selective layer of the membrane are formed from fluorinated monomers of (i) dioxoles, which are five-member rings of the form

that polymerize by opening of the double bond, or (ii) dioxolanes, similar five-member rings but without the double bond in the main ring.

Not all polymers of such structure are suitable. For example, certain of the polymers and copolymers of perfluoro-2,2-dimethyl-1,3-dioxole reported in U.S. Pat. No. 5,051,114 have been shown to switch from being nitrogen-selective to being methane-selective in the presence of $C_{3-}$ hydrocarbons.

These polymers are, however, characterized by very high fractional free volume within the polymer, typically above 0.3, low density, such as below about 1.8 g/cm$^3$, and are unusually gas permeable, for instance exhibiting pure gas permeabilities as high as 500 Barrer or more for nitrogen.

It is believed that polymers with denser chain packing, and thus lower fractional free volume, higher density and lower permeability, are more resistant to plasticization by hydrocarbons. Hence, it is important that the polymer used for the membranes of stage 108 should preferably be limited to those having a fractional free volume less than about 0.3.

In referring to fractional free volume (FFV), we mean the free volume per unit volume of the polymer, defined and calculated as:

$$FFV = SFV/v_{sp}$$

where SFV is the specific free volume, calculated as:

$$SFV = v_{sp} - v_0 = V_{sp} - 1.3 v_w$$

and where:

$v_{sp}$ is the specific volume (cm$^3$/g) of the polymer determined from density or thermal expansion measurements, $v_0$ is the zero point volume at 0° K., and $v_w$ is the van der Waals volume calculated using the group contribution method of Bondi, as described in D. W. van Krevelan, *Properties of polymers*, 3$_{rd}$ Edition, Elsevier, Amsterdam, 1990, pages 71–76.

In terms of density, preferred polymers should have a density above about 1.8 g/cm$^3$.

In terms of permeability, preferred polymers should exhibit a relatively low permeability for hydrocarbons and a relatively high permeability for nitrogen. Expressing these preferences quantitatively, the polymer should exhibit a propane permeability (as measured with pure propane at 25° C.) no higher than about 20 Barrer, and more preferably no higher than about 10 Barrer. In addition, the polymer should exhibit a nitrogen permeability of at least about 1 Barrer and most preferably of at least about 5 Barrer. Although these nitrogen numbers seem low, they are unusually high for glassy polymers, as seen in Table 1.

The polymers are preferably rigid and glassy during operation, in which case they should have glass transition temperatures comfortably above temperatures to which they are typically exposed during the process. Polymers with glass transition temperature above about 100° C. are preferred, and, subject also to the other requirements and preferences above, the higher the glass transition temperature, in other words, the more rigid the polymer, the more preferred it is.

The polymers should preferably take amorphous, rather than crystalline form, because crystalline polymers are typically essentially insoluble and thus render membrane making difficult, as well as exhibiting low gas permeability.

As stated above, the polymers are fluorinated. More preferably, they have a fluorine:carbon ratio of atoms in the polymer of at least about 1:1, and most preferably, they are perfluorinated.

The polymers may be homopolymers or copolymers with other monomer repeat units. For preference, these other repeat units should be at least partially fluorinated, and most preferably heavily fluorinated or perfluorinated. A number of suitable materials are known, for example, fluorinated ethers, ethylene and propylene.

Particularly when perfluorinated, homopolymers made from these materials, such as polytetrafluoroethylene (PTFE) and the like, are very resistant to plasticization. However, they tend to be crystalline or semi-crystalline and to have gas permeabilities too low for any useful separation application. As constituents of copolymers with the fluorinated ring structures defined above, however, they can produce materials that combine amorphous structure, good permeability and good resistance to plasticization. Copolymers that include tetrafluoroethylene units are particularly preferred. Other specific examples of copolymers that are suitable are polyhexafluoropropylene and chlorofluoro ethylenes and propylene.

Specific most preferred materials are copolymers of tetrafluoroethylene with 2,2,4-trifluoro-5-trifluoromethoxy-1,3-dioxole having the structure:

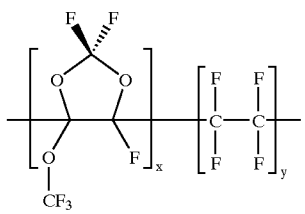

where x and y represent the relative proportions of the dioxole and the tetrafluoroethylene blocks, such that x+y=1.

Such materials are available commercially from Ausimont S.p.A., of Milan, Italy under the trade name Hyflon® AD. Different grades are available varying in proportions of the dioxole and tetrafluoroethylene units, with fluorine:carbon ratios of between 1.5 and 2, depending on the mix of repeat units. For example, grade Hyflon AD 60 contains a 60:40 ratio of dioxole to tetrafluoroethylene units, has a fractional free volume of 0.23, a density of 1.93 g/cm$^3$ and a glass transition temperature of 121° C., and grade Hyflon AD 80 contains an 80:20 ratio of dioxole to tetrafluoroethylene units, has a fractional free volume of 0.23, a density of 1.92 g/cm$^3$ and a glass transition temperature of 134° C.

Yet other preferred materials are polyperfluoro (alkenyl vinyl ethers) including polyperfluoro (allyl vinyl ether) and polyperfluoro (butenyl vinyl ether), available commercially from Asahi Glass Company, of Tokyo, Japan under the trade name Cytop®. Typically, Cytop has a fractional free volume of 0.21, a density of 2.03 g/cm$^3$, a glass transition temperature of 108° C., and a fluorine:carbon ratio of 1.7. Such materials are discussed at length in the co-owned patents and pending applications referred to in the background section of this application, all of which are incorporated herein by reference.

The perfluorinated, cyclic polymers typified by the Hyflon® and Cytop® product ranges are believed to provide the best overall combinations of selectivity and permeability under the operating conditions and constraints of most nitrogen/methane separations. These materials offer nitrogen/methane selectivity above 2 in many cases, in conjunction with nitrogen permeabilities (such as 5 Barrer, 10 Barrer or above) that are typically much higher than those obtainable from typical polyimides.

Because all of these preferred polymers are glassy and rigid, an unsupported film of the polymer is usable in principle as a single-layer gas separation membrane in stage 108. However, such layers are normally far too thick to yield acceptable transmembrane flux, and preferably, the separation membrane comprises a very thin selective layer that forms part of a thicker structure, such as an asymmetric membrane or a composite membrane. The thin skin or coating layer is responsible for the separation properties and the underlying integral or discrete microporous support layer is responsible for mechanical strength. Additional layers can be added if desired, such as to seal the support layer before the selective layer is applied, to protect the surface from abrasion, and so on.

The nitrogen/methane selectivity that can be obtained from most membranes under real operating conditions is small. With gas mixtures typical of raw natural gas streams, the best nitrogen/methane selectivity that can be obtained is typically no higher than between about 2 and 3. However, as shown in the Examples section below, and contrary to what has generally been believed to be the case by those of skill in the art, useful processes are possible even with low nitrogen/methane selectivity. Higher selectivity membranes, if they are available, may be used but are not required.

Typically, the membrane selectivity for the preferred materials increases as the temperature declines, but the lower temperature also results in lower permeability. Since the glassy materials of stage 108 have lower permeability than the rubbery materials of steps 102 and 104 of the first stage, the membrane permeability may drop to such a degree that adequate transmembrane flux cannot be obtained if very low temperatures are used. Also, the use of very low temperatures will tend to encourage condensation of any $C_{3+}$ hydrocarbons present in the gas stream within the membrane unit.

Thus, the preferred operating temperatures for stage 108 are similar to those for steps 102 and 104, that is between about 40° C. and −40° C., and more preferably between about 25° C. and −25° C.

A driving force for transmembrane permeation in stage 108 is, as above, provided by a pressure difference between the feed and permeate sides of the membrane.

As discussed above, the pressure on the permeate side of membrane separation step 102 may be set to any value. Occasionally, it may be possible to keep the permeate pressure in this step so high that stage 108 can be operated without recompressing stream 107. In most cases, however, stream 107 will require compression. The preferred operating pressure on the feed side for step 108 is between about 400 psi and 1,800 psi.

The polymeric materials used for the nitrogen-selective membranes of stage 108 tend to be less permeable than the materials used for the first stage. Nevertheless, it is preferred that stage 108 provide a transmembrane pressure-normalized nitrogen flux provided of at least about 1 gpu, more preferably at least about 50 gpu and most preferably at least about 100 gpu. Thus the selective layer responsible for the membrane separation properties in stage 108 will frequently be thinner than those used for steps 102 and 104, and will typically be less than about 5 μm thick, and more preferably thinner still such as 1 or 2 μm or less in thickness.

Membrane separation stage 108 results in a third residue stream, 109, that is yet further depleted in nitrogen. Stream 109, normally the most nitrogen-lean process stream, is withdrawn from the process as the primary product stream. Although pipeline specification is 4% total inerts, it may not always be necessary to reduce the nitrogen content of stream 109 to 4% or below. For example, it may be possible to pool stream 109 with other gas that has a low inerts content before the stream is passed to the pipeline. Thus, in some cases, a nitrogen concentration of, for example, 6%, or even 8% or more, may be acceptable. Conversely, owing to a high content of other inert gases, such as carbon dioxide, it may sometimes be necessary to reduce the nitrogen concentration below 4%. Based on the present teachings, those of skill in the art will be able to adjust the process for greater or lesser nitrogen concentration as required.

Besides meeting the target composition, the amount of methane recovered in stream 109 is important in some cases. If the primary goal of operating the process is to recover an enriched nitrogen stream for reinjection, for example, then stream 105 may be the primary product stream, and the creation of a small purified natural gas stream as stream 109 may add value, but not be vital to the process economics. Similarly, if the process is operated chiefly to provide fuel gas for field operations, the purified natural gas stream is of secondary importance.

On the other hand, in some cases, the purified natural gas stream, 109, is the primary product stream, and it is preferred to recover as much of the methane content of the raw feed as is practically possible. Under these circumstances, it is most preferred that stream 109 contain at least about 70%, or even at least about 80%, of the methane content of the feed stream, 101.

Stream 109 may be passed to the gas pipeline or to any other desired destination.

Membrane separation stage 108 also results in a third permeate stream, 110. Permeate stream 110 represents gas that has been once depleted in nitrogen (in step 102) and once enriched in nitrogen (in stage 104). Typically, therefore, stream 110 has a nitrogen concentration of about the same order as that of the feed stream 101. As with stream 106, therefore, it is preferred, although not required, to recirculate stream 110 to the front of the process.

Figure 2:
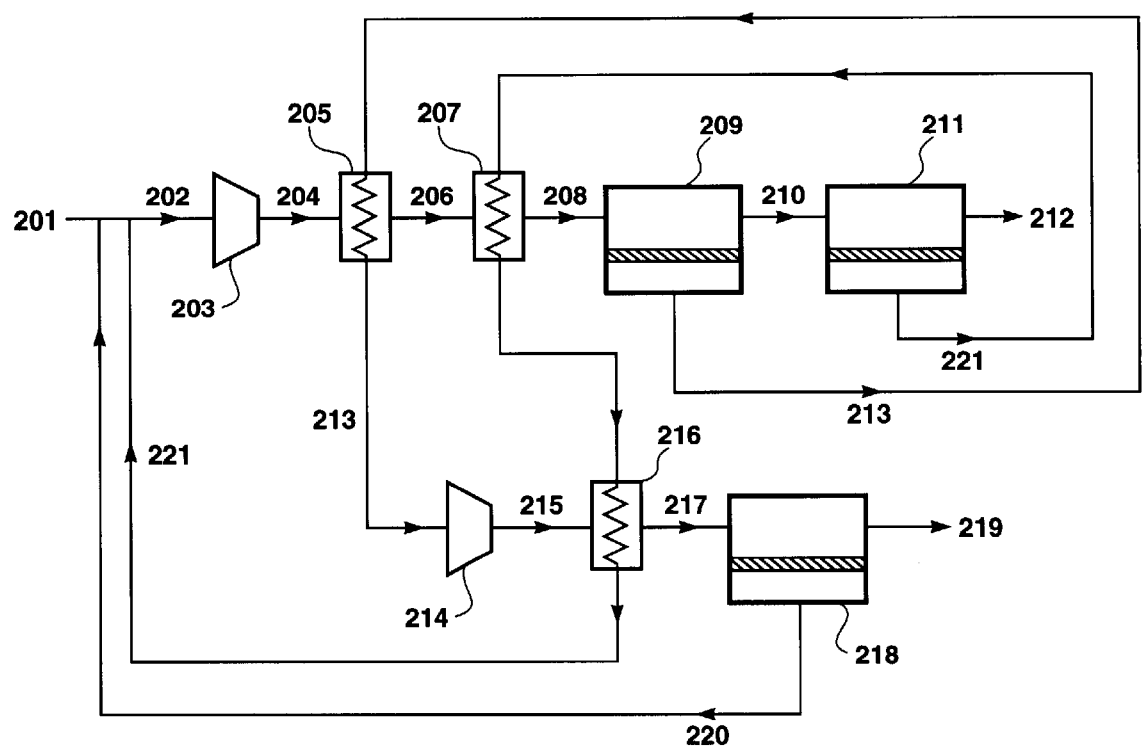
FIG. 2 is a schematic drawing of a preferred embodiment of the invention including recycle of the second and third permeate streams, compression of the incoming feed and first permeate streams, and cooling provided by heat exchange.

Turning to FIG. 2, this shows a preferred embodiment of the invention, including cooling of the incoming membrane feed stream by heat exchange against the membrane permeate streams, and recirculation of the second and third permeate streams within the process. Unless otherwise indicated, parameter preferences and comments, such as those relating to membrane type, selectivity, gas temperatures at the inlets of the individual membrane separation steps, feed and permeate pressures and pressure ratio, and permeate product stream composition, for FIG. 2 are the same as those for FIG. 1.

Raw gas stream, 201, may be any natural gas or other methane-containing gas, and may or may not have been subjected to pretreatment, such as filtration, removal of contaminant gases (such as carbon dioxide, water vapor or $C_{3+}$ hydrocarbons), or partial separation of nitrogen from methane. Stream 201 will usually contain at least about 4% nitrogen, frequently contains at least about 10% nitrogen, and may contain a much greater concentration of nitrogen, such as about 25%, 30% or more. Unless treatment to remove carbon dioxide has already been carried out, stream 201 will commonly contain carbon dioxide in amounts that exceed target specification.

Stream 201 is typically at above atmospheric pressure, such as at a few hundred psia, but is not at sufficiently high pressure for the desired process performance. This stream is combined with recirculation streams 220 and 221, described below, to form combined feed stream 202, which passes into compression step, 203.

The compressor used in compression step 203 may be of any convenient type, such as centrifugal, screw or reciprocating, based on considerations of outlet pressure needed, gas flow rate and composition, and like issues familiar to those of skill in the art. Screw compressors are relatively inexpensive and are widely used to reach pressures up to about 300 or 400 psia; for higher pressures, piston compressors are more commonly used. Typically, but not necessarily, the compression step raises the pressure of the gas stream between about 3-fold and 10-fold. This may be done in a single-stage or multiple-stage compressor, as is well known in the art.

For most applications of the process, it is neither necessary nor desirable to compress the feed gas to very high pressures. Preferably, compression step 203 raises the pressure of stream 202 to between about 400 psia and 1,800 psia, and more preferably to between about 500 psia and 1,500 psia.

As mentioned already, it is convenient, desirable, and generally possible to use waste gas from the process to power a gas engine to drive the compressor. This provides a cost advantage that is one of the attractive features of the process.

Gas emerges from compression step 203 as compressed stream, 204, and passes through first heat exchange step 205, where it is cooled by running in heat exchanging relationship against first permeate stream, 213, forming partially cooled stream, 206.

Step 205 and the other heat-exchange steps shown in FIG. 2 may be carried out in any manner, such as by the use of individual shell-and-tube heat exchangers, or by using more sophisticated equipment, such as a brazed aluminum heat exchanger, capable of accepting multiple streams and thereby integrating the various heat transfer operations.

Since $C_{3+}$ hydrocarbons and water are always likely to be present in stream 204 to some extent, cooling will frequently result in the condensation of a portion of these hydrocarbons and water, which may be removed in a knock-out pot, not shown, as is well known in the industry. Stream 206 passes through second heat exchange step 207, where it is cooled by running in heat exchanging relationship against second permeate stream, 221, to form cooled stream, 208. Again, any condensed material may be removed by running through a knock-out pot.

Stream 208 is passed on the feed side into membrane separation step, 209. Membrane separation step 209 produces a first residue stream, 210, that is enriched in nitrogen and depleted in methane compared with the membrane feed stream, 208, and a first permeate stream, 213, that is enriched in methane and depleted in nitrogen compared with stream 208. If carbon dioxide is present in stream 201, it will permeate the membrane used for step 209 preferentially over both nitrogen and methane and stream 213 will be considerably enriched in carbon dioxide compared with stream 201.

Permeate stream 213, which may be as much as 20° C. or more cooler than the raw feed stream 201, is used to cool the incoming gas by passing as coolant through heat exchange step 205.

As discussed above, the permeate side of membrane separation step 209 is usually maintained at above atmospheric pressure, so the pressure of stream 213 may be as high as 100 psia, 200 psia or more. The stream is passed into compression step 214, which, as above, uses any convenient type of compressor, to raise the pressure, preferably to between about 400 psia and 1,800 psia.

If stream 201 is natural gas and the purpose of carrying out the process is to produce gas that meets pipeline specification, it is often beneficial to operate stage 218 at a pressure on the feed side that is compatible with pipeline pressure, so that the product gas can be delivered to the pipeline without further compression.

Compressed stream 215 passes through heat exchange step 216, where it is cooled by running in heat exchanging relationship against second permeate stream, 221, forming cooled stream, 217. This stream forms the feed stream to second stage membrane separation, 218. Stage 218 uses nitrogen-selective membranes, selected and operated according to the criteria already described with respect to membrane separation stage 108 of FIG. 1.

Membrane separation stage 218 yields third residue stream, 219. This stream, which remains at high pressure, is the methane-rich treated gas product stream, and may be sent to the gas pipeline or any other destination.

Membrane separation stage 218 also yields third permeate stream, 220. It is convenient to maintain pressure on the permeate side comparable to the pressure of raw gas stream 201, in which case stream 220 may be recirculated to the front of the process as shown to form part of stream 202. If stream 220 is at lower pressure than stream 201, it may be introduced at a lower pressure intake of compression step 203, or may be separately recompressed.

Carbon dioxide is readily permeable through many membrane materials, so, if carbon dioxide is present in stream 217, it will again permeate preferentially over both nitrogen and methane and stream 220 will be enriched in carbon dioxide compared with stream 201. In this case, carbon dioxide will tend to build up in the process loop created by recirculating stream 220. This build up can be controlled, if necessary, by recirculating only a portion of stream 220 as shown, and purging a portion of the stream from the loop, either directly, or selectively by including two membrane separation steps in the second membrane stage, as illustrated in the Examples.

Returning to the first stage, step 209, this also produces first residue stream 210. Stream 210 is passed as feed to second membrane separation step 211, where it is separated into second permeate stream 221 and second residue stream 212. Second permeate stream 221 is passed as coolant through heat exchange steps 207 and 216, and is then recirculated to the front of the process to form part of the feed 202 to compression step 203. As discussed with respect to the third permeate stream, stream 220 may be mixed with raw stream 201 if at an appropriate pressure, or may be separately recompressed.

Second residue stream 212 is withdrawn from the process, and may be used as engine or turbine fuel, particularly for a gas engine used to drive the compressor for compression step 203, may be reinjected, may simply be flared, or may be subjected to further treatment as desired.

If hydrogen sulfide is present in the raw gas stream 201, it will behave in a similar manner to carbon dioxide, that is, it will tend to be selectively permeable in both membrane stages, and can be removed from the process loop by a similar purge.

If helium is present in the raw gas stream, the process may be used to yield a helium-enriched stream as illustrated in the Examples.

Figure 3:
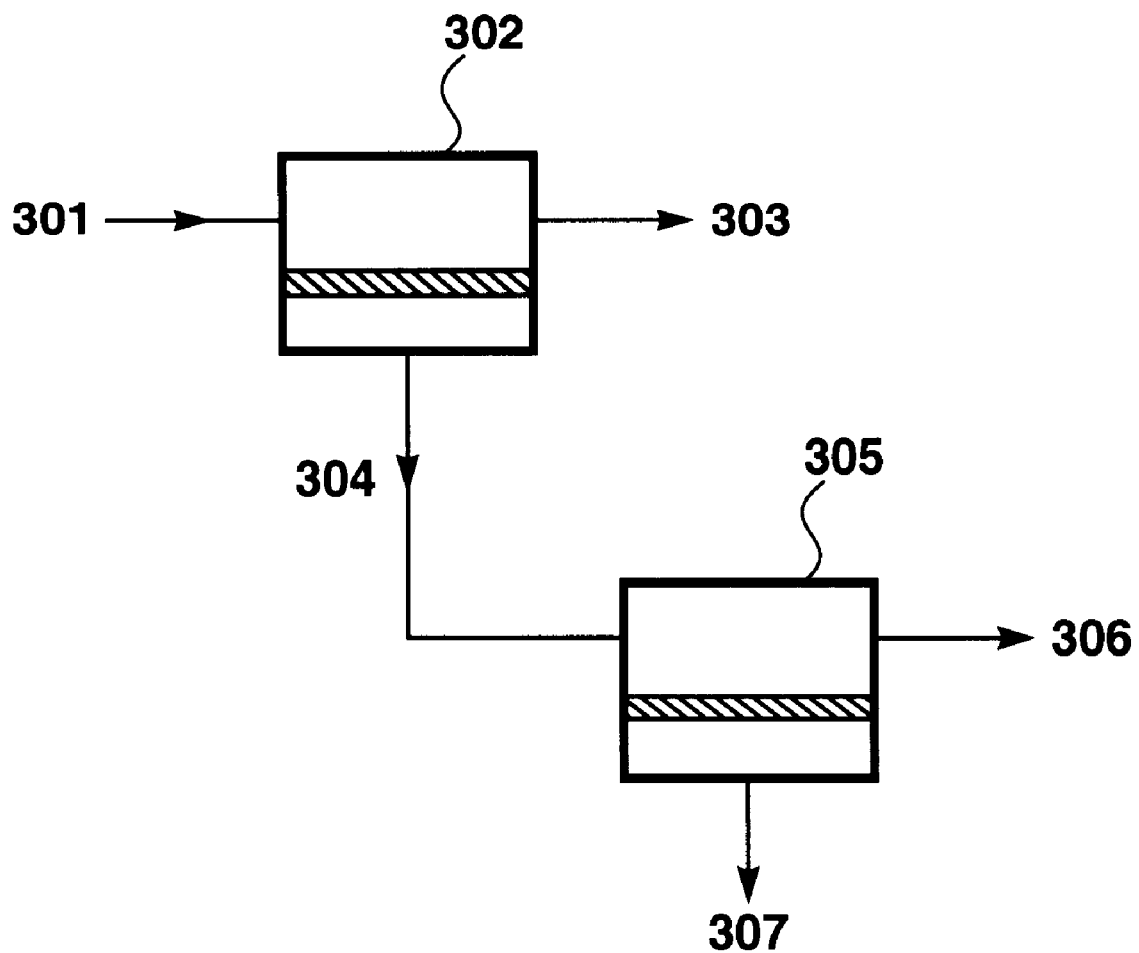
FIG. 3 is a schematic drawing of an embodiment of the invention using only a single membrane separation step in the first stage.

FIG. 3 shows an alternative, but less preferred, embodiment of the invention that uses a single membrane separation step in the first stage. Again, unless otherwise indicated, all preferences and comments relating to gas stream data, membrane types and process operating parameters are similar to those for FIGS. 1 and 2.

Raw gas stream 301, after optional compression and cooling (not shown) is passed on the feed side into membrane separation step, 302. Membrane separation step 302 produces a first residue stream, 303, that is enriched in nitrogen and depleted in methane compared with the membrane feed stream, 301, and a first permeate stream, 304, that is enriched in methane and depleted in nitrogen compared with stream 208.

Residue stream 303 is withdrawn from the process and is sent to any desired destination. Preferably, at least a portion of stream 303 is used as fuel gas to drive field engines or the like.

First permeate stream 304, after optional recompression (not shown), is passed as a feed stream into second membrane separation stage 305. This stage contains membranes that are selective in favor of nitrogen over methane and yields second residue stream, 306. This stream, which remains at high pressure, is the methane-rich treated gas product stream, and may be sent to the gas pipeline or any other destination.

Membrane separation stage 305 also yields second permeate stream, 307, which is preferably, but not necessarily, recirculated to the front of the process, after recompression if required.

The embodiment of FIG. 3 may also incorporate heat integration by heat exchange between warm and cool streams, as described above with respect to FIG. 2.

The invention in this embodiment is suitable, by way of non-limiting example, for treating gas streams that are not very heavily contaminated with nitrogen. In this case, it may be possible to bring stream 304 close to the target nitrogen content, and use the second stage to reduce the nitrogen content just a little more.

The process in this embodiment may also be used for treating a gas stream 301 that is to be used as fuel gas, and for which a nitrogen content of 30%, 40% or more is adequate. The first step may then be used to take a cut of nitrogen-reduced gas, 304, out of the feed stream, 301, before it is passed to the fuel line. The second stage is then used to extract a stream 306, albeit a small stream, of pipeline grade gas as an additional valuable product.

The invention is now further described by the following examples, which are intended to be illustrative of the invention, but are not intended to limit the scope or underlying principles in any way.

EXAMPLES

Example 1

A computer calculation was performed with a modeling program, ChemCad V (ChemStations, Inc., Houston, Tex.), to demonstrate the process of the invention in an embodiment in which the first membrane separation stage has only a single membrane separation step, as in FIG. 3.

The flow rate of the raw gas was assumed to be 10 MMscfd. The gas was assumed to have the following mole composition:

| | |
|---|---|
| Nitrogen | 20.0% |
| Methane | 72.1% |
| Ethane | 5.0% |
| Propane | 2.0% |
| n-Butane | 0.5% |
| Water | 0.4% |

The raw gas was assumed to be at 25° C. and 200 psia, and to be compressed to 1,000 psia and cooled to 30° C. before being passed into membrane separation step 302. A phase separator was assumed to be used to remove water that condensed under these conditions.

The permeate side of the first membrane stage was assumed to be maintained at 100 psia, and the permeate side of the second membrane stage was assumed to be maintained at 200 psia. The first permeate stream was assumed to be recompressed to 1,000 psia and cooled to 30° C. before being passed into second membrane separation stage 305. The second permeate steam was assumed to be recirculated and mixed with the raw feed stream. The calculations were performed to yield a product gas, stream 306, containing 4% nitrogen, in accordance with pipeline specifications. The stream numbers correspond to FIG. 3. The results of the calculations are summarized in Table 2.

rate of about 6 MMscfd and contains 30% nitrogen, is withdrawn from the process and would be suitable for use as fuel gas.

Example 2

Another calculation, similar to that of Example 1, was performed according to the embodiment of FIG. 2, to show the difference in performance obtainable from use of a second membrane separation step in the first stage. Thus, in this process design, the first residue stream is passed to a second membrane separation step 211.

It was assumed that the second-step permeate, stream 221, is not recycled within the process as shown in FIG. 2, but is withdrawn from the process.

The flow rate of the raw gas again was assumed to be 10 MMscfd. All other process parameters were assumed to be as in Example 1. As with the calculation of Example 1, a phase separator was assumed to be used to remove water that condensed under the processing conditions. The stream

TABLE 2

| | Stream | | | | | |
|---|---|---|---|---|---|---|
| | 301 | 301 + 307 | 303 | 304 | 306 | 307 |
| Mass Flow (lb/h) | 23,115 | 31,399 | 14,298 | 17,103 | 8,736 | 8,366 |
| Temp. (° C.) | 25 | 30 | 11 | 30 | 18 | 24 |
| Pressure (psia) | 200 | 1,000 | 1,000 | 1,000 | 1,000 | 200 |
| Flow Rate (MMscfd) | 10.0 | 13.9 | 6.2 | 7.7 | 3.8 | 3.9 |
| Component (mol %): | | | | | | |
| Nitrogen | 20.0 | 17.7 | 30.0 | 7.9 | 4.0 | 11.7 |
| Methane | 72.1 | 75.3 | 67.7 | 81.2 | 79.9 | 82.5 |
| Ethane | 5.0 | 5.0 | 2.0 | 7.4 | 10.0 | 4.8 |
| Propane | 2.0 | 1.6 | 0.3 | 2.6 | 4.8 | 0.5 |
| n-Butane | 0.5 | 0.4 | — | 0.7 | 1.3 | 0.1 |
| Water | 0.4 | 0.1 | — | 0.2 | — | 0.3 |

Membrane area = 881 + 684 m$^2$
Theoretical horsepower = 1,283 + 1,081 hp
— = less than 0.1

The process yielded 3.8 MMscfd of gas as product stream 306, containing 4% nitrogen. Stream 303, which has a flow numbers correspond to FIG. 2. The results of the calculations are summarized in Table 3.

TABLE 3

| | Stream | | | | | | | | | |
|---|---|---|---|---|---|---|---|---|---|---|
| | 201 | 202 | 208 | 210 | 212 | 221 | 213 | 217 | 219 | 220 |
| Mass Flow (lb/h) | 23,115 | 31,483 | 31,400 | 14,298 | 3,638 | 10,660 | 17,104 | 17,104 | 8,736 | 8,367 |
| Temp. (° C.) | 25 | 25 | 30 | 11 | −14 | −2 | 20 | 30 | 118 | 24 |
| Pressure (psia) | 200 | 200 | 1,000 | 1,000 | 1,000 | 50 | 100 | 1,000 | 1,000 | 200 |
| Flow Rate (MMscfd) | 10.0 | 13.9 | 13.9 | 6.2 | 1.3 | 4.9 | 7.7 | 7.7 | 3.8 | 3.9 |
| Component (mol %): | | | | | | | | | | |
| Nitrogen | 20.0 | 17.6 | 17.6 | 30.0 | 70.0 | 19.5 | 7.9 | 7.9 | 4.0 | 11.7 |
| Methane | 72.1 | 75.0 | 75.3 | 67.7 | 30.0 | 77.7 | 81.2 | 81.2 | 79.9 | 82.5 |
| Ethane | 5.0 | 5.0 | 5.0 | 2.0 | 0.1 | 2.5 | 7.4 | 7.4 | 10.0 | 4.8 |
| Propane | 2.0 | 1.6 | 1.6 | 0.3 | — | 0.4 | 2.6 | 2.6 | 4.8 | 0.5 |

TABLE 3-continued

| | Stream | | | | | | | | | |
|---|---|---|---|---|---|---|---|---|---|---|
| | 201 | 202 | 208 | 210 | 212 | 221 | 213 | 217 | 219 | 220 |
| n-Butane | 0.5 | 0.4 | 0.4 | — | 0.0 | — | 0.7 | 0.7 | 1.3 | 0.1 |
| Water | 0.4 | 0.4 | 0.1 | — | 0.0 | — | 0.2 | 0.2 | — | 0.3 |

Membrane area = 881 + 684 + 399 m$^2$
Theoretical horsepower = 1,283 + 1,081 hp
— = less than 0.1

The process again yielded 3.8 MMscfd of gas as product stream 219, containing 4% nitrogen. Second permeate stream 221 has a flow rate of less than 5 MMscfd and contains less than 20% nitrogen. Thus, this stream would provide a smaller volume, higher quality fuel gas than stream 303 of Example 1. Second residue stream, 212, has a flow rate of 1.3 MMscfd and contains 70% nitrogen and only 30% methane. This stream could be flared or reinjected.

Examples 3–4

Figure 4:
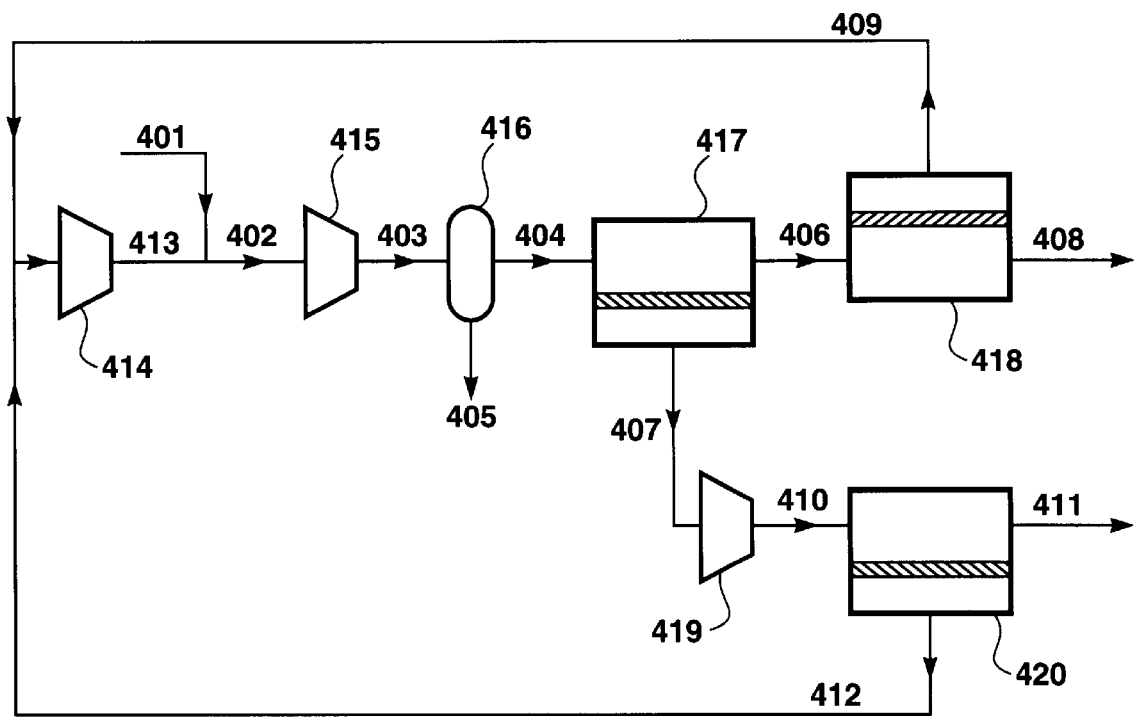
FIG. 4 is a schematic drawing of an embodiment of the invention including a phase-separation step for removing condensed liquid.

Two computer calculations were performed with a modeling program, ChemCad V, to illustrate the process of the invention using the process design shown in FIG. 4. The goal of the process was to produce pipeline-grade natural gas from a raw gas stream containing 18% nitrogen.

It was assumed that the raw gas contained water vapor that was condensed when the gas was cooled after compression. It was further assumed that the recirculated permeate streams were at lower pressure than the raw gas and were introduced into the main compression train at a lower pressure intake point than the raw gas.

Example 3

Not in Accordance With the Invention

For the first calculation, it was assumed that the process used only a two-step configuration, with rubbery, methane-selective membranes in both steps. Thus referring to FIG. 4, nitrogen-contaminated natural gas stream 401 is mixed with partially compressed recycle stream 413 from compression stage 414 to form stream 402. Stream 402 is compressed in compression stage 415 to form compressed stream 403. Stream 403 is cooled and passed to phase separator 416, from which condensed water is removed as stream 405. Uncondensed stream 404 is passed to first membrane separation step 417, where it is separated into methane-rich permeate stream 407 and nitrogen-enriched residue stream 406.

For this calculation, step 420 was not used; the methane product was assumed to be stream 407. As can be seen from Table 4, this does not quite meet pipeline specification of 4% nitrogen.

Residue stream 406 is passed to second membrane separation step 418. Nitrogen-rich waste stream 408 is withdrawn from this step and may be passed to the fuel header or elsewhere. Nitrogen-depleted permeate stream 409 is too rich in methane to be used as fuel gas, so it is recompressed in compression stage 414. Compressed stream 413 is recirculated to the separation steps. In this manner, the process produces two product streams, a treated natural gas stream and a waste stream containing less than 50% methane.

The feed gas was assumed to be at 600 psia and 26° C., and the feed flow was assumed to be 10 MMscfd. The results of the calculations are summarized in Table 4.

TABLE 4

| | Stream | | | | | | | | |
|---|---|---|---|---|---|---|---|---|---|
| | 401 | 402 | 403 | 404 | 405 | 406 | 407 | 408 | 409 |
| Flow (MMscfd) | 10.0 | 40.1 | 40.1 | 40.1 | 0.05 | 32.8 | 7.2 | 2.7 | 30.1 |
| Temperature (° C.) | 26 | 97 | 5 | 5 | 5 | −1 | 2 | −37 | −19 |
| Pressure (psia) | 600 | 600 | 1,200 | 1,200 | 1,200 | 1,200 | 200 | 1,200 | 200 |
| Component (mol %): | | | | | | | | | |
| Nitrogen | 18.0 | 11.8 | 11.8 | 11.9 | 0.0 | 13.4 | 4.6 | 53.8 | 9.8 |
| Methane | 77.0 | 85.1 | 85.1 | 85.2 | 0.0 | 84.4 | 89.1 | 46.2 | 87.8 |
| Ethane | 3.0 | 2.1 | 2.1 | 2.1 | 0.0 | 1.6 | 4.1 | — | 1.8 |
| Propane | 1.0 | 0.6 | 0.6 | 0.6 | 0.0 | 0.4 | 1.4 | — | 0.4 |
| n-Butane | 0.5 | 0.3 | 0.3 | 0.3 | 0.0 | 0.2 | 0.7 | — | 0.1 |
| Water | 0.5 | 0.1 | 0.1 | — | 100.0 | — | 0.1 | 0.0 | — |

— = less than 0.01
Membrane area = 2,321 (406 + 1,915) m$^2$
Theoretical horsepower = 3,525 (1,793 + 1,732) hp As can be seen, the process yields 7.2 MMscfd of natural gas as product steam 407, containing 4.6% nitrogen. Methane recovery is good, at 83%.

Example 4

The calculation of Example 3 was repeated, except this time using membrane stage 420. Thus, first permeate stream 407, depleted in nitrogen and enriched in methane, is recompressed in compressor 419, and passed as compressed stream 410 to second membrane stage 420. This stage was assumed to contain the fluorinated nitrogen-selective membranes disclosed above, and to separate stream 407 into methane-enriched residue stream 411, which is withdrawn as the primary product, and nitrogen-enriched permeate stream 412, which is recirculated to compression stage 414.

All other process parameters were assumed to be as in Example 3. The results are shown in Table 5.

TABLE 5

| | Stream | | | | | | | | | | | | |
|---|---|---|---|---|---|---|---|---|---|---|---|---|---|
| | 401 | 402 | 403 | 404 | 405 | 406 | 407 | 408 | 409 | 410 | 411 | 412 | 413 |
| Flow (MMscfd) | 10.0 | 41.4 | 41.4 | 41.4 | 0.005 | 34.1 | 7.3 | 3.2 | 30.8 | 7.3 | 6.7 | 0.6 | 31.4 |
| Temperature (° C.) | 26 | 98 | 6 | 6 | 6 | 0 | 3 | −36 | −18 | 25 | 24 | 24 | 122 |
| Pressure (psia) | 600 | 600 | 1200 | 1,200 | 1,200 | 1,200 | 200 | 1,200 | 200 | 600 | 600 | 200 | 600 |
| Component (mol %): | | | | | | | | | | | | | |
| Nitrogen | 18.0 | 10.9 | 10.9 | 10.9 | 0.0 | 12.3 | 4.2 | 47.2 | 8.6 | 4.2 | 4.0 | 6.9 | 8.6 |
| Methane | 77.0 | 86.0 | 86.0 | 86.1 | 0.0 | 85.4 | 89.3 | 52.8 | 88.8 | 89.3 | 89.3 | 89.7 | 88.9 |
| Ethane | 3.0 | 2.2 | 2.2 | 2.2 | 0.0 | 1.7 | 4.3 | 0.1 | 1.9 | 4.3 | 4.4 | 2.6 | 1.9 |
| Propane | 1.0 | 0.6 | 0.6 | 0.6 | 0.0 | 0.4 | 1.4 | — | 0.4 | 1.4 | 1.5 | 0.5 | 0.4 |
| n-Butane | 0.5 | 0.3 | 0.3 | 0.3 | 0.0 | 0.2 | 0.7 | — | 0.2 | 0.7 | 0.7 | 0.1 | 0.2 |
| Water | 0.5 | 0.1 | 0.1 | — | 100.0 | — | 0.1 | — | 0.1 | 0.1 | 0.1 | 0.2 | — |

— = less than 0.01
Membrane area = 2,441 (406 + 1,915 + 120) m$^2$
Theoretical horsepower = 4,056 (1,853 + 1,806 + 397) hp As can be seen, addition of the nitrogen-selective membrane separation step as a second stage to polish the natural gas product enables the process to meet pipeline specification of 4% nitrogen.

Examples 5–7

A series of calculations were performed to illustrate the process of the invention according to the embodiment of FIG. 2 for reducing both the nitrogen and carbon dioxide contents of a natural gas stream. As shown in FIG. 2, both permeate stream 221 and permeate stream 220 were assumed to be recirculated. To remove carbon dioxide, a portion of the second-stage permeate, stream 220, was assumed to be purged from the recycle loop.

For these calculations, the flow rate of the incoming raw gas was assumed to be 10 MMscfd. The gas was assumed to have the following mole composition:

| Nitrogen | 20.0% |
|---|---|
| Methane | 69.1% |
| Ethane | 5.0% |
| Propane | 2.0% |
| n-Butane | 0.5% |
| Carbon Dioxide | 3.0% |
| Water | 0.4% |

The raw gas stream 201 was assumed to be at 25° C. and 200 psia, and to be compressed to 1,000 psia and cooled to 30° C. before being passed into membrane separation step 209. A phase separator was assumed to be used to remove water that condensed under these conditions.

The calculations were performed in each case to yield a product stream 219 containing 4% nitrogen.

Example 5

A base-case calculation was performed with no carbon dioxide purge taken from stream 220. The stream numbers correspond to FIG. 2. The results of the calculations are summarized in Table 6.

TABLE 6

| | Stream | | | | | | | | | |
|---|---|---|---|---|---|---|---|---|---|---|
| | 201 | 202 | 208 | 210 | 212 | 221 | 213 | 217 | 219 | 220 |
| Mass Flow (lb/h) | 24,089 | 101,950 | 101,867 | 21,527 | 9,006 | 12,521 | 80,340 | 80,340 | 14,687 | 65,653 |
| Temp. (° C.) | 25 | 14 | 30 | −1 | −20 | −10 | 15 | 30 | −1 | 15 |
| Pressure (psia) | 200 | 200 | 1,000 | 1,000 | 1,000 | 200 | 100 | 1,000 | 1,000 | 200 |
| Flow Rate (MMscfd) | 10.0 | 31.3 | 31.3 | 9.0 | 3.5 | 5.5 | 22.3 | 22.3 | 6.4 | 15.9 |
| Component (mol %): | | | | | | | | | | |
| Nitrogen | 20.0 | 11.5 | 11.5 | 30.0 | 50.0 | 17.4 | 4.1 | 4.1 | 4.0 | 4.1 |
| Methane | 69.1 | 49.1 | 49.2 | 66.0 | 49.0 | 76.8 | 42.4 | 42.4 | 81.2 | 26.7 |
| Ethane | 5.0 | 2.5 | 2.5 | 1.4 | 0.4 | 1.9 | 3.0 | 3.0 | 7.6 | 1.1 |
| Propane | 2.0 | 0.7 | 0.7 | 0.2 | — | 0.2 | 1.0 | 1.0 | 3.1 | 0.1 |
| n-Butane | 0.5 | 0.2 | 0.2 | — | — | — | 0.2 | 0.2 | 0.8 | — |
| Carbon Dioxide | 3.0 | 35.7 | 35.7 | 2.4 | 0.5 | 3.6 | 49.2 | 49.2 | 3.4 | 67.7 |
| Water | 0.4 | 0.2 | 0.1 | — | 0.0 | — | 0.2 | 0.2 | — | 0.2 |

Membrane area = 1,500 + 877 + 552 m$^2$
Theoretical horsepower = 2,734 + 3,043 hp
— = less than 0.1

The process yielded 6.4 MMscfd of gas as product stream 219, containing 4% nitrogen, but containing 3.4% carbon dioxide. In this case, therefore, stream 219 would not meet typical pipeline specifications. A fuel or flare gas stream, stream 212, of 3.5 MMscfd and containing 50% nitrogen and 49% methane, is also produced. All other streams are recycled within the process.

Example 6

The calculation of Example 5 was repeated, except that 10 vol % of stream 220 was assumed to be purged from the system to help reduce the carbon dioxide content of the product gas. The remaining 90% of stream 220 was assumed to be recycled within the process as shown in FIG. 2. The stream numbers correspond to FIG. 2. The results of the calculations are summarized in Table 7.

Stream 220 would meet typical individual specifications for nitrogen and carbon dioxide, but would not meet typical total inerts specification of 4%. Fuel or flare gas stream, stream 212, is 3.4 MMscfd and contains 50% nitrogen and 49% methane.

Example 7

The calculation of Example 6 was repeated, this time assuming 30 vol % of stream 220 was purged from the

TABLE 7

| | Stream | | | | | | | | | | |
|---|---|---|---|---|---|---|---|---|---|---|---|
| | 201 | 202 | 208 | 210 | 212 | 221 | 213 | 217 | 219 | 220 | $CO_2$ purge |
| Mass Flow (lb/h) | 24,089 | 56,332 | 56,255 | 20,753 | 8,748 | 12,006 | 35,493 | 35,493 | 13,007 | 22,486 | 2,249 |
| Temp. (° C.) | 25 | 18 | 30 | 11 | −9 | 1 | 20 | 30 | 11 | 20 | 20 |
| Pressure (psia) | 200 | 200 | 1,000 | 1,000 | 1,000 | 200 | 100 | 1,000 | 1,000 | 200 | 200 |
| Flow Rate (MMscfd) | 10.0 | 22.4 | 22.3 | 8.9 | 3.4 | 5.5 | 13.4 | 13.4 | 5.8 | 7.6 | 0.8 |
| Component (mol %): | | | | | | | | | | | |
| Nitrogen | 20.0 | 15.9 | 16.0 | 30.0 | 50.0 | 17.6 | 6.7 | 6.7 | 4.0 | 8.7 | 8.7 |
| Methane | 69.1 | 68.8 | 68.9 | 67.6 | 49.3 | 78.9 | 69.7 | 69.7 | 82.4 | 60.2 | 60.2 |
| Ethane | 5.0 | 3.6 | 3.6 | 1.5 | 0.5 | 2.3 | 5.0 | 5.0 | 8.0 | 2.7 | 2.7 |
| Propane | 2.0 | 1.0 | 1.0 | 0.2 | — | 0.3 | 1.6 | 1.6 | 3.4 | 0.3 | 0.3 |
| n-Butane | 0.5 | 0.2 | 0.2 | — | — | — | 0.4 | 0.4 | 0.9 | — | — |
| Carbon Dioxide | 3.0 | 10.2 | 10.2 | 0.7 | 0.1 | 1.0 | 16.4 | 16.4 | 1.4 | 27.8 | 27.8 |
| Water | 0.4 | 0.3 | 0.1 | — | 0.0 | — | 0.2 | 0.2 | — | 0.3 | 0.3 |

Membrane area = 1,337 + 883 + 554 m$^2$
Theoretical horsepower = 2,012 + 1,885 hp
— = less than 0.1

The process yielded 5.8 MMscfd of gas as product stream 219, containing 4% nitrogen and 1.4% carbon dioxide. Thus, by purging only 10% of stream 220, the carbon dioxide content of the product stream is reduced from 3.4% to 1.4%.

system. The remaining 70% of stream 220 was assumed to be recycled within the process as shown in FIG. 2. The stream numbers correspond to FIG. 2. The results of the calculations are summarized in Table 8.

TABLE 8

| | Stream | | | | | | | | | | |
|---|---|---|---|---|---|---|---|---|---|---|---|
| | 201 | 202 | 208 | 210 | 212 | 221 | 213 | 217 | 219 | 220 | $CO_2$ purge |
| Mass Flow (lb/h) | 24,089 | 46,155 | 46,084 | 19,706 | 8,317 | 11,390 | 26,375 | 26,375 | 11,123 | 15,252 | 4,576 |
| Temp. (° C.) | 25 | 18 | 30 | 11 | −9 | 1 | 20 | 20 | 16 | 23 | 23 |
| Pressure (psia) | 200 | 200 | 1,000 | 1,000 | 1,000 | 200 | 100 | 100 | 1,000 | 200 | 200 |
| Flow Rate (MMscfd) | 10.0 | 19.4 | 19.4 | 805.0 | 3.2 | 5.2 | 10.9 | 10.9 | 4.9 | 6.0 | 1.8 |
| Component (mol %): | | | | | | | | | | | |
| Nitrogen | 20.0 | 17.2 | 17.3 | 30.0 | 50.0 | 17.6 | 7.4 | 7.4 | 4.0 | 10.2 | 10.2 |
| Methane | 69.1 | 72.2 | 72.3 | 67.7 | 49.4 | 79.1 | 75.9 | 75.9 | 81.8 | 71.1 | 71.1 |
| Ethane | 5.0 | 3.9 | 3.9 | 1.6 | 0.5 | 2.3 | 5.7 | 5.7 | 8.5 | 3.4 | 3.4 |
| Propane | 2.0 | 1.2 | 1.2 | 0.2 | — | 0.3 | 2.0 | 2.0 | 3.9 | 0.4 | 0.4 |
| n-Butane | 0.5 | 0.3 | 0.3 | — | — | — | 0.5 | 0.5 | 1.0 | 0.1 | 0.1 |
| Carbon Dioxide | 3.0 | 4.8 | 4.8 | 0.4 | 0.1 | 0.6 | 8.3 | 8.3 | 0.7 | 14.5 | 14.5 |
| Water | 0.4 | 0.3 | 0.1 | — | — | — | 0.2 | 0.2 | — | 0.3 | 0.3 |

Membrane area = 1,172 + 843 + 512 m$^2$
Theoretical horsepower = 1,754 + 1,532 hp
— = less than 0.1

The process yielded 4.9 MMscfd of gas as product stream 219, containing 4% nitrogen and only 0.7% carbon dioxide. Purging 30% of stream 220 reduces the total inerts content of the product stream essentially to pipeline specification. (If the desired nitrogen content had been set a little lower, this configuration would have fully met total inerts limits.) A fuel or flare gas stream, stream 212, is 3.2 MMscfd and contains 50% nitrogen and 49% methane.

Example 8

Figure 5:
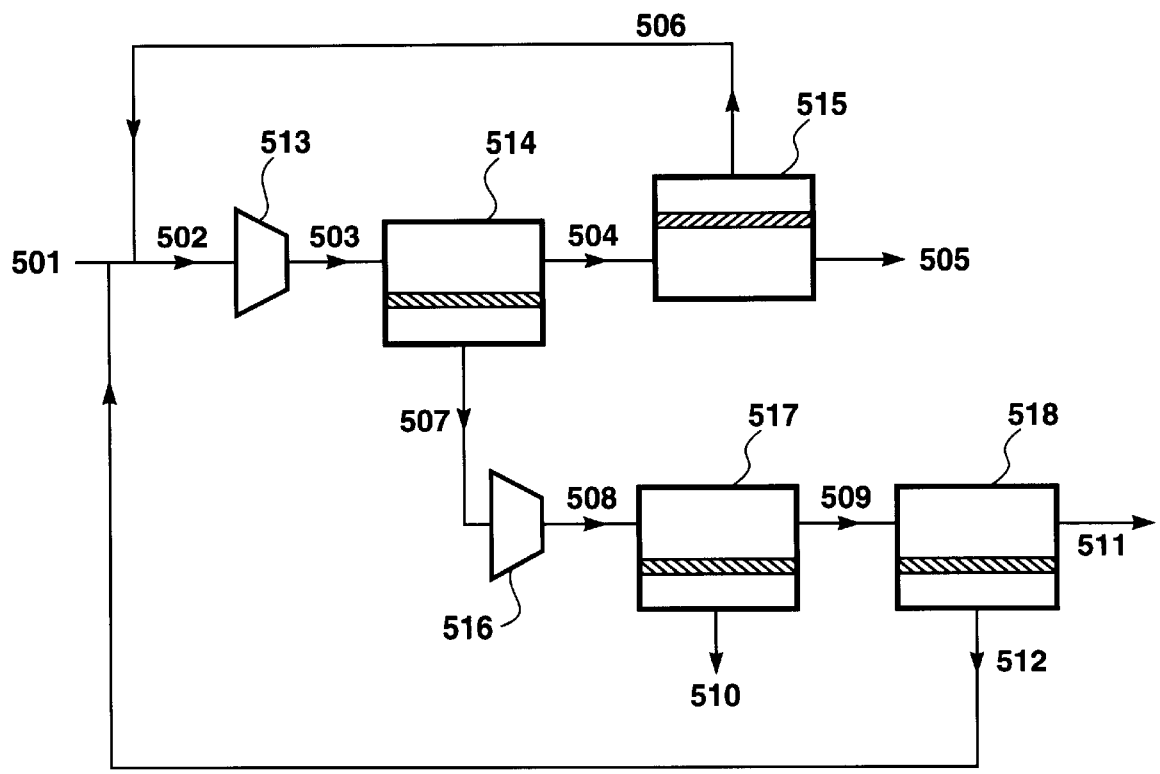
FIG. 5 is a schematic drawing of an embodiment of the invention using two membrane separation steps in the second stage.

Examples 5–7 demonstrated that purging a portion of the recycle stream can reduce the carbon dioxide level of the product gas to pipeline specification. Another method of removing carbon dioxide and improving the overall process performance is to include two membrane separation steps in the second stage, and using the auxiliary membrane separation step to selectively purge carbon dioxide, as shown in FIG. 5.

Turning to this figure, stream 501 is the raw natural gas stream, to which is added second-step permeate stream 506 and second-stage permeate stream 512. The combined stream, stream 502 is compressed in compressor 513 and passed as compressed stream 503 to first membrane separation step 514. This step contains membranes selective in favor of methane over nitrogen, as discussed in relation to unit 102 of FIG. 1.

The first-step residue, stream 504 is enriched in nitrogen and depleted of methane, and is passed to a second membrane step 515, also containing methane-selective membranes. Second-step residue stream 505 is withdrawn as shown. Second-step permeate stream 506 is recycled to the front of the process to be mixed with raw gas stream 501.

The first-step permeate stream 507, enriched in methane and, in this example, in carbon dioxide, is recompressed in compressor 516, and passed as compressed stream 508 to membrane unit 517. This unit contains the same glassy, carbon-dioxide- and nitrogen-selective membranes as discussed in relation to unit 108 of FIG. 1. Unit 517 selectively purges carbon dioxide and nitrogen, as stream 510, from the process loop.

Carbon-dioxide-depleted residue stream 509 is passed to membrane unit 518, also containing nitrogen-selective membranes. The nitrogen-enriched permeate, stream 512, is recycled to the front of the process to be mixed with raw gas stream 501. Residue stream 511 is withdrawn as a product stream.

A computer calculation was performed according to the embodiment of FIG. 5. The feed stream composition and process parameters were assumed to be as in Example 5. The raw gas was assumed to be at 25° C. and 200 psia, and to be compressed to 1,000 psia and cooled to 30° C. before being passed into membrane separation step 514. A phase separator was assumed to be used to remove water that condensed under these conditions.

Second permeate stream 506 was assumed to be withdrawn from step 515 at 50 psia and to be recirculated to the main compression train at a lower pressure intake point than the raw gas according to the scheme shown in FIG. 4.

The results of the calculations are summarized in Table 9. Stream numbers correspond to FIG. 5.

The process yields 5.7 MMscfd of gas as product stream 511, containing 4% nitrogen and only 0.1% carbon dioxide. This is an increase of 0.8 MMscfd compared with the calculation of Example 7. The 2.2 MMscfd of gas removed as permeate stream 510 from membrane unit 517 contains almost 30% of combined nitrogen/carbon dioxide, but still contains 69% methane. This is a useful fuel gas stream. The second residue stream, 505, has a flow rate of 2.1 MMscfd and contains 70% nitrogen and 30% methane and is at a pressure of 1,000 psia. A stream of this type could be usable for reinjection purposes or flared.

TABLE 9

| | Stream | | | | | | | | | | | |
|---|---|---|---|---|---|---|---|---|---|---|---|---|
| | 501 | 502 | 503 | 504 | 505 | 506 | 507 | 508 | 509 | 510 | 511 | 512 |
| Mass Flow (lb/h) | 24,089 | 49,926 | 49,881 | 23,255 | 5,917 | 17,337 | 26,633 | 26,633 | 21,064 | 5,569 | 12,564 | 8,500 |
| Temp. (° C.) | 25 | 10 | 30 | 11 | −14 | −2 | 20 | 30 | 25 | 27 | 16 | 20 |
| Pressure (psia) | 200 | 50 | 1,000 | 1,000 | 1,000 | 50 | 100 | 1,000 | 1,000 | 50 | 1,000 | 200 |
| Flow Rate (MMscfd) | 10.0 | 22.0 | 21.9 | 10.0 | 2.1 | 8.0 | 11.9 | 11.9 | 9.7 | 2.2 | 5.7 | 4.0 |
| Component (mol %): | | | | | | | | | | | | |
| Nitrogen | 20.0 | 18.0 | 18.1 | 30.0 | 70.0 | 19.5 | 8.0 | 8.0 | 6.6 | 14.2 | 4.0 | 10.2 |
| Methane | 69.1 | 75.1 | 75.2 | 68.1 | 30.0 | 78.2 | 81.2 | 81.2 | 84.0 | 68.8 | 83.8 | 84.3 |
| Ethane | 5.0 | 3.7 | 3.7 | 1.5 | 0.1 | 1.9 | 5.5 | 5.5 | 6.2 | 2.5 | 7.8 | 3.8 |
| Propane | 2.0 | 1.1 | 1.1 | 0.2 | — | 0.3 | 1.8 | 1.8 | 2.2 | 0.2 | 3.4 | 0.4 |
| n-Butane | 0.5 | 0.2 | 0.2 | — | 0.0 | — | 0.4 | 0.4 | 0.5 | — | 0.9 | 0.1 |
| Carbon Dioxide | 3.0 | 1.6 | 1.6 | 0.1 | — | 0.2 | 2.9 | 2.9 | 0.5 | 13.4 | 0.1 | 1.2 |
| Water | 0.4 | 0.2 | 0.1 | — | 0.0 | — | 0.2 | 0.2 | — | 0.8 | — | 0.1 |

Membrane area = 1,351 + 1,118 + 398 m$^2$ + aux 150 m$^2$
Theoretical horsepower = 4,288 + 1,675 hp
— = less than 0.1

Examples 9–13

A series of calculations were performed to illustrate the effect of varying the nitrogen concentration in the permeate stream, 407, from the first membrane separation step that is passed to the second stage. The calculations were performed assuming a process configuration as in FIG. 4, with condensation and removal of water from the feed stream, and a multistage compressor for the main compression stage 414/415.

The raw gas was assumed to be at 25° C. and a pressure of 200 psia, and to be compressed to 1,000 psia in compression stage 415. In the first membrane stage, the first permeate stream, 407, was assumed to be withdrawn at 100 psia, and the second permeate stream, 409, was assumed to be withdrawn at 50 psia and recirculated to the main compression train stage 414 at a lower pressure intake point than the raw gas.

Permeate stream 407 was assumed to be recompressed to 1,000 psia in compressor 419 before being fed to unit 420. Permeate stream 412 was assumed to be withdrawn at 200 psia and recirculated to the main compression train at the same point as the raw gas.

The raw gas was assumed to have the following mole composition:

| | |
|---|---|
| Nitrogen | 20.0% |
| Methane | 71.1% |
| Ethane | 5.0% |
| Propane | 2.0% |
| n-Butane | 0.5% |
| Carbon Dioxide | 1.0% |
| Water | 0.4% |

The calculations were performed to yield a product gas stream containing 4% nitrogen, in accordance with pipeline specifications, and a discharge stream from the first membrane separation stage with a methane/nitrogen content of about 50/50.

Example 9

A first calculation was performed assuming that step 420 was not used; the methane product was assumed to be first permeate stream 407.

The results of the calculations are summarized in Table 10. The stream numbers correspond FIG. 4.

TABLE 10

| | Stream | | | | | | |
|---|---|---|---|---|---|---|---|
| | 401 | 402 | 404 | 406 | 408 | 407 | 409 |
| Mass Flow (lb/h) | 23,440 | 72,430 | 72,396 | 57,896 | 8,906 | 14,500 | 48,990 |
| Temp. (° C.) | 25 | 11 | 30 | 24 | −7 | 27 | 8 |
| Pressure (psia) | 200 | 200 | 1,000 | 1,000 | 1,000 | 100 | 50 |
| Flow Rate (MMscfd) | 10.0 | 33.4 | 33.4 | 26.9 | 3.5 | 6.5 | 23.4 |
| Component (mol %): | | | | | | | |
| Nitrogen | 20.0 | 11.9 | 11.9 | 13.8 | 50.0 | 4.0 | 8.4 |
| Methane | 71.1 | 81.6 | 81.6 | 81.4 | 49.8 | 82.7 | 86.1 |
| Ethane | 5.0 | 4.3 | 4.3 | 3.5 | 0.2 | 7.6 | 4.0 |
| Propane | 2.0 | 1.3 | 1.3 | 0.9 | — | 3.1 | 1.0 |
| n-Butane | 0.5 | 0.3 | 0.3 | 0.1 | 0.0 | 0.8 | 0.2 |
| Carbon Dioxide | 1.0 | 0.5 | 0.5 | 0.3 | — | 1.5 | 0.3 |
| Water | 0.4 | 0.1 | 0.1 | — | 0.0 | 0.4 | — |

Membrane area = 664 + 2,628 m²
Theoretical horsepower = 6,484 + 923 hp
— = less than 0.1

The process requires a total of 3,292 m² of membrane area and 7,407 theoretical horsepower to accomplish the separation.

Example 10

The calculation of Example 9 was repeated, this time assuming that second membrane separation stage 420 was used. The calculation was performed to provide a first permeate stream, 407, with a nitrogen concentration of 5%, and a final product nitrogen concentration in stream 411 of 4%. Other process parameters were assumed to be as in Example 9.

The results of the calculations are summarized in Table 11. Stream numbers correspond to FIG. 4.

TABLE 11

| | Stream | | | | | | | | | |
|---|---|---|---|---|---|---|---|---|---|---|
| | 401 | 402 | 404 | 406 | 408 | 409 | 407 | 410 | 411 | 412 |
| Mass Flow (lb/h) | 23,440 | 59,286 | 59,217 | 39,965 | 8,913 | 31,052 | 19,251 | 19,251 | 14,458 | 4,793 |
| Temp. (° C.) | 25 | 10 | 30 | 19 | −12 | 4 | 25 | 30 | 24 | 27 |

TABLE 11-continued

| | Stream | | | | | | | | | |
|---|---|---|---|---|---|---|---|---|---|---|
| | 401 | 402 | 404 | 406 | 408 | 409 | 407 | 410 | 411 | 412 |
| Pressure (psia) | 200 | 50 | 1,000 | 1,000 | 1,000 | 50 | 100 | 1,000 | 1,000 | 200 |
| Flow Rate (MMscfd) | 10.0 | 26.8 | 26.7 | 18.2 | 3.5 | 14.7 | 8.5 | 8.5 | 6.5 | 2.0 |
| Component (mol %): | | | | | | | | | | |
| Nitrogen | 20.0 | 13.8 | 13.8 | 17.9 | 50.0 | 10.4 | 5.0 | 5.0 | 4.0 | 8.2 |
| Methane | 71.1 | 79.1 | 79.2 | 78.2 | 49.8 | 84.9 | 81.5 | 81.5 | 83.0 | 76.8 |
| Ethane | 5.0 | 4.0 | 4.0 | 2.7 | 0.2 | 3.3 | 6.7 | 6.7 | 7.6 | 3.7 |
| Propane | 2.0 | 1.2 | 1.2 | 0.6 | — | 0.7 | 2.4 | 2.4 | 3.1 | 0.4 |
| n-Butane | 0.5 | 0.2 | 0.2 | 0.1 | 0.0 | 0.1 | 0.6 | 0.6 | 0.8 | — |
| Carbon Dioxide | 1.0 | 1.5 | 1.5 | 0.5 | — | 0.6 | 3.6 | 3.6 | 1.5 | 10.1 |
| Water | 0.4 | 0.2 | 0.1 | — | 0.0 | — | 0.3 | 0.3 | 0.1 | 0.8 |

Membrane area = 885 + 1,732 + 183 m$^2$
Theoretical horsepower = 5,190 + 1,203 hp
— = less than 0.1

The process requires a total of 2,800 m$^2$ of membrane area and 6,393 theoretical horsepower to accomplish the separation.

Example 11

The calculation of Example 10 was repeated, this time increasing the membrane area used in the first step, 417, of the first stage to provide a first permeate stream, 407, with a nitrogen concentration of 6%, and a final product nitrogen concentration in stream 411 of 4%. Other process parameters were assumed to be as in Example 9. The results of the calculations are summarized in Table 12.

Example 12

The calculation of Example 11 was repeated, this time further increasing the membrane area of step 417 to provide a first permeate stream, 407, with a nitrogen concentration of 7%, and a final product nitrogen concentration in stream 411 of 4%. In this case, the composition of residue stream 406 already reaches the 50/50 nitrogen/methane point, so no second step, 418 is required. Other process parameters were assumed to be as in Example 9.

TABLE 12

| | Stream | | | | | | | | | |
|---|---|---|---|---|---|---|---|---|---|---|
| | 401 | 402 | 404 | 406 | 408 | 409 | 407 | 410 | 411 | 412 |
| Mass Flow (lb/h) | 23,440 | 53,752 | 53,673 | 26,827 | 8,920 | 17,907 | 26,844 | 26,844 | 14,439 | 12,405 |
| Temp. (° C.) | 25 | 10 | 30 | 11 | −14 | −2 | 20 | 30 | 18 | 24 |
| Pressure (psia) | 200 | 50 | 1,000 | 1,000 | 1,000 | 50 | 100 | 1,000 | 1,000 | 200 |
| Flow Rate (MMscfd) | 10.0 | 23.2 | 23.1 | 11.9 | 3.5 | 8.4 | 11.2 | 11.2 | 6.5 | 4.8 |
| Component (mol %): | | | | | | | | | | |
| Nitrogen | 20.0 | 15.1 | 15.1 | 23.8 | 50.0 | 12.9 | 6.0 | 6.0 | 4.0 | 8.7 |
| Methane | 71.1 | 75.3 | 75.4 | 73.4 | 49.7 | 83.2 | 77.6 | 77.6 | 83.0 | 70.3 |
| Ethane | 5.0 | 3.8 | 3.8 | 1.9 | 0.3 | 2.6 | 5.7 | 5.7 | 7.6 | 3.1 |
| Propane | 2.0 | 1.1 | 1.1 | 0.3 | — | 0.4 | 1.9 | 1.9 | 3.1 | 0.3 |
| n-Butane | 0.5 | 0.2 | 0.2 | — | — | — | 0.5 | 0.5 | 0.8 | — |
| Carbon Dioxide | 1.0 | 4.2 | 4.3 | 0.6 | — | 0.8 | 8.1 | 8.1 | 1.5 | 17.1 |
| Water | 0.4 | 0.3 | 0.1 | — | 0.0 | — | 0.2 | 0.2 | — | 0.4 |

Membrane area = 1,169 + 1,044 + 397 m$^2$
Theoretical horsepower = 4,512 + 1,577 hp
— = less than 0.1

The process requires a total of 2,610 m$^2$ of membrane area and 6,089 theoretical horsepower The results of the calculations are summarized in Table 13.

TABLE 13

| | Stream | | | | | | |
|---|---|---|---|---|---|---|---|
| | 401 | 402 | 404 | 406 | 410 | 411 | 412 |
| Mass Flow (lb/h) | 23,440 | 85,984 | 85,900 | 8,819 | 76,790 | 14,247 | 62,543 |
| Temp. (° C.) | 25 | 13 | 30 | −6 | 30 | 5 | 18 |

TABLE 13-continued

| | Stream | | | | | | |
|---|---|---|---|---|---|---|---|
| | 401 | 402 | 404 | 406 | 410 | 411 | 412 |
| Pressure (psia) | 200 | 50 | 1,000 | 1,000 | 1,000 | 1,000 | 200 |
| Flow Rate (MMscfd) | 10.0 | 28.2 | 28.2 | 3.4 | 24.7 | 6.5 | 18.2 |
| Component (mol %): | | | | | | | |
| Nitrogen | 20.0 | 12.3 | 12.3 | 50.7 | 7.0 | 4.0 | 8.1 |
| Methane | 71.1 | 54.9 | 55.0 | 48.9 | 55.8 | 83.7 | 46.0 |
| Ethane | 5.0 | 2.9 | 2.9 | 0.4 | 3.3 | 7.5 | 1.8 |
| Propane | 2.0 | 0.8 | 0.8 | — | 0.9 | 3.1 | 0.2 |
| n-Butane | 0.5 | 0.2 | 0.2 | — | 0.2 | 0.8 | — |
| Carbon Dioxide | 1.0 | 28.7 | 28.7 | 0.1 | 32.6 | 0.9 | 43.8 |
| Water | 0.4 | 0.2 | 0.1 | 0.0 | 0.1 | — | 0.2 |

Membrane area = 2,189 + 1,021 $m^2$
Theoretical horsepower = 5,503 + 3,370 hp
— = less than 0.1

The process requires a total of 3,210 $m^2$ of membrane area and 8,873 theoretical horsepower to accomplish the separation.

Example 13

The membrane areas used for each membrane separation step in Examples 9 through 12 are summarized in Table 14.

TABLE 14

| | Nitrogen in | Membrane Area ($m^2$) | | | | |
|---|---|---|---|---|---|---|
| Example | First Permeate (stream 407) (mol %) | First-Step First-Stage (unit 417) | Second-Step First-Stage (unit 418) | Second Stage (unit 420) | Total | Theoretical Horsepower (hp) |
| 9 | 4 | 664 | 2,628 | 0 | 3,292 | 7,404 |
| 10 | 5 | 885 | 1,731 | 183 | 2,800 | 6,393 |
| 11 | 6 | 1,169 | 1,043 | 396 | 2,610 | 6,089 |
| 12 | 7 | 2,188 | 0 | 1,020 | 3,210 | 8,873 |

As can be seen, a higher membrane area in the first step, 417, results in a higher nitrogen concentration in the first permeate. As increasingly more gas is processed in step 417, the second step, 418, requires a progressively smaller membrane area to bring the second residue stream to the target nitrogen/methane mix of 50/50, and ultimately, the second step is not required.

Also, as more gas is processed in step 417, the greater is the membrane area needed for second stage 420. Overall, for a raw gas of the composition used for this set of examples, the lowest membrane area and horsepower requirements are achieved when the system is configured to obtain a first permeate containing 6% nitrogen.

A similar analysis could be performed for other gas compositions to optimize the system configuration. Such an analysis is useful for modifying the membrane areas if the gas composition varies over time.

Example 14

A computer calculation was performed assuming that the raw gas stream contains helium, and has the following mole composition:

| | |
|---|---|
| Nitrogen | 20.0% |
| Methane | 69.1% |
| Ethane | 5.0% |
| Propane | 2.0% |

-continued

| | |
|---|---|
| n-Butane | 0.5% |
| Water | 0.4% |
| Helium | 3.0% |

The process was assumed to be carried out generally as shown in FIG. 5 to achieve a product stream containing 4% nitrogen. The flow rate of the raw gas was assumed to be 10 MMscfd. The gas was assumed to be at 25° C. and 200 psia, and to be compressed to 1,000 psia in compressor 513. As in earlier examples, a phase separator was assumed to be used to remove water that condensed under these conditions.

The first permeate stream, 507, was assumed to be withdrawn at 100 psia, and the second permeate stream, 506, was assumed to be withdrawn at 50 psia and recirculated to the main compression train at a lower pressure intake point than the raw gas, in similar manner to the scheme shown in FIG. 4.

Permeate stream 507 was assumed to be recompressed to 1,000 psia in compressor 516 before being fed to unit 517. Permeate stream 512 from unit 518 was assumed to be withdrawn at 200 psia and recirculated to the main compression train at the same point as the raw gas. The results of the calculation are summarized in Table 15.

As can be seen, the process produces three product streams, 511, 505 and 510. Stream 511 meets pipeline specification for nitrogen. Stream 505 contains 70% nitrogen and could be sent to flare or reinjected. Stream 510 contains 11% helium and could be sent for further processing to recover a helium product.

TABLE 15

| | Stream | | | | | | | | | | | |
|---|---|---|---|---|---|---|---|---|---|---|---|---|
| | 501 | 502 | 503 | 504 | 505 | 506 | 507 | 508 | 509 | 510 | 511 | 512 |
| Mass Flow (lb/h) | 22,696 | 55,450 | 55,400 | 25,647 | 5,963 | 19,683 | 29,758 | 29,758 | 26,901 | 2,858 | 13,830 | 13,070 |
| Temp. (° C.) | 25 | 11 | 30 | 11 | −14 | −2 | 20 | 30 | 28 | 29 | 16 | 22 |
| Pressure (psia) | 200 | 50 | 1,000 | 1,000 | 1,000 | 50 | 1,000 | 1,000 | 1,000 | 50 | 1,000 | 200 |
| Flow Rate (MMscfd) | 10.0 | 25.5 | 25.5 | 11.4 | 2.2 | 9.2 | 14.1 | 14.1 | 12.7 | 1.5 | 6.4 | 6.3 |
| Component (mol %): | | | | | | | | | | | | |
| Nitrogen | 20.0 | 18.0 | 18.0 | 30.0 | 70.0 | 20.6 | 8.3 | 8.3 | 7.5 | 15.6 | 4.0 | 11.1 |
| Methane | 69.1 | 74.8 | 74.9 | 64.9 | 23.6 | 74.6 | 83.0 | 83.0 | 84.4 | 69.9 | 84.7 | 84.2 |
| Ethane | 5.0 | 3.4 | 3.4 | 1.3 | — | 1.5 | 5.1 | 5.1 | 5.4 | 2.2 | 7.3 | 3.4 |
| Propane | 2.0 | 0.9 | 0.9 | 0.2 | — | 0.2 | 1.6 | 1.6 | 1.7 | 0.2 | 3.1 | 0.3 |
| n-Butane | 0.5 | 0.2 | 0.2 | — | 0.0 | — | 0.4 | 0.4 | 0.4 | — | 0.8 | — |
| Water | 0.4 | 0.2 | 0.1 | — | 0.0 | — | 0.2 | 0.2 | 0.1 | 1.1 | — | 0.1 |
| Helium | 3.0 | 2.5 | 2.5 | 3.7 | 6.3 | 3.1 | 1.5 | 1.5 | 0.4 | 11.0 | — | 0.8 |

Membrane area = 1,687 + 1,362 + 618 m² + aux 100 m²
Theoretical horsepower = 5,017 + 1,996 hp
— = less than 0.1

We claim:

1. A process for treating a gas stream comprising methane and at least about 4% nitrogen, comprising the steps of:
   (a) providing a first membrane unit containing a first membrane having a first feed side and a first permeate side, the first membrane being more permeable to methane than to nitrogen;
   (b) providing a second membrane unit containing a second membrane having a second feed side and a second permeate side, the second membrane being more permeable to methane than to nitrogen, the second membrane unit being connected in series with the first membrane unit such that gas leaving the first feed side can enter the second membrane unit on the second feed side;
   (c) providing a third membrane unit containing a third membrane having a third feed side and a third permeate side, the third membrane being more permeable to nitrogen than to methane, the third membrane unit being connected in series with the first membrane unit such that gas leaving the first permeate side can enter the third membrane unit on the third feed side;
   (d) passing the gas stream at a first pressure into the first membrane unit at a first inlet of the first feed side;
   (e) withdrawing from a first outlet of the first feed side a first residue stream enriched in nitrogen compared with the gas stream;
   (f) withdrawing from the first permeate side, at a second pressure lower than the first pressure, a first permeate stream depleted in nitrogen compared with the gas stream;
   (g) passing the first residue stream into the second membrane unit at a second inlet of the second feed side;
   (h) withdrawing from a second outlet of the second feed side a second residue stream enriched in nitrogen compared with the first residue stream;
   (i) withdrawing from the second permeate side, at a third pressure lower than the first pressure, a second permeate stream depleted in nitrogen compared with the first residue stream;
   (j) passing the first permeate stream, at a fourth pressure, into the third membrane unit at a third inlet of the third feed side;
   (k) withdrawing from a third outlet of the third feed side a third residue stream depleted in nitrogen compared with the first permeate stream;
   (l) withdrawing from the third permeate side, at a fifth pressure lower than the fourth pressure, a third permeate stream enriched in nitrogen compared with the first permeate stream.

2. The process of claim 1, further comprising recirculating the third permeate stream to step (d).

3. The process of claim 1, further comprising recirculating the second permeate stream to step (d).

4. The process of claim 1, further comprising recirculating both the third permeate stream and the second permeate stream to step (d).

5. The process of claim 1, further comprising compressing the gas stream prior to step (d).

6. The process of claim 1, wherein the first pressure is in the range 500–1,500 psia.

7. The process of claim 1, further comprising compressing the first permeate stream prior to step (j).

8. The process of claim 1, wherein the fourth pressure is in the range 500–1,500 psia.

9. The process of claim 1, wherein the second pressure, third pressure and fifth pressure are all at least about 100 psia.

10. The process of claim 1, wherein the gas stream is cooled by heat exchange against at least one of the first and second permeate streams before step (d).

11. The process of claim 1, wherein the gas stream is cooled to a temperature between about 25° C. and −25° C. prior to step (d).

12. The process of claim 1, wherein the first permeate stream is cooled prior to step (j).

13. The process of claim 1, wherein the gas stream comprises natural gas.

14. The process of claim 1, wherein the gas stream contains at least about 10% nitrogen.

15. The process of claim 1, wherein the first membrane and the second membrane comprise silicone rubber.

16. The process of claim 1, wherein the third membrane comprises a polymer having a repeat unit comprising a fluorinated cyclic structure.

17. The process of claim 1, wherein the third residue stream contains no more than about 6% nitrogen.

18. The process of claim 1, wherein the third residue stream contains no more than about 4% nitrogen.

19. The process of claim 1, wherein the third residue stream contains at least about 70% of the methane content of the gas stream.

20. The process of claim 1, wherein the second residue stream contains at least about 50% nitrogen.

21. The process of claim 1, wherein at least a portion of the second residue stream is reinjected into a formation from which the gas stream is extracted.

22. The process of claim 1, wherein at least a portion of the second residue stream is used as fuel for a gas engine used to drive a compressor.

23. The process of claim 1, wherein at least a portion of the second permeate stream is used as fuel for a gas engine used to drive a compressor.

24. The process of claim 1, wherein the gas stream further comprises carbon dioxide.

25. The process of claim 1, wherein the gas stream further comprises carbon dioxide and further comprising recirculating a first portion of the third permeate stream to step (d) and discharging a second portion of the third permeate stream from the process.

26. The process of claim 1, further comprising subjecting the gas stream to cooling and phase separation to remove condensed liquids before step (d).

27. The process of claim 1, further comprising:
(m) providing a fourth membrane unit containing a fourth membrane having a fourth feed side and a fourth permeate side, the fourth membrane being more permeable to nitrogen than to methane, the fourth membrane unit being connected in series with the third membrane unit such that gas leaving the third feed side can enter the fourth membrane unit on the fourth feed side;
(n) passing the third residue stream into the fourth membrane unit at a fourth inlet of the fourth feed side;
(o) withdrawing from a fourth outlet of the fourth feed side a fourth residue stream depleted in nitrogen compared with the first permeate stream;
(p) withdrawing from the fourth permeate side, at a sixth pressure lower than the fourth pressure, a fourth permeate steam enriched in nitrogen compared with the first permeate stream.

28. A process for treating a gas stream comprising methane and at least about 4% nitrogen, comprising the steps of:

a) providing a first membrane unit containing a first membrane having a first feed side and a first permeate side, the first membrane being more permeable to methane than to nitrogen;

(b) providing a second membrane unit containing a second membrane having a second feed side and a second permeate side, the second membrane being more permeable to nitrogen than to methane, the second membrane unit being connected in series with the first membrane unit such that gas leaving the first permeate side can enter the second membrane unit on the second feed side;

(c) passing a gas stream, comprising methane and at least about 4% nitrogen, at a first pressure, into the first membrane unit at a first inlet of the first feed side;

(d) withdrawing from a first outlet of the first feed side a first residue stream enriched in nitrogen compared with the gas stream;

(e) withdrawing from the first permeate side, at a second pressure lower than the first pressure, a first permeate stream depleted in nitrogen compared with the gas stream;

(f) passing the first permeate stream, at a third pressure, into the second membrane unit at a second inlet of the second feed side;

(g) withdrawing from a second outlet of the second feed side a second residue stream depleted in nitrogen compared with the first permeate stream;

(h) withdrawing from the second permeate side, at a fourth pressure lower than the third pressure, a second permeate stream enriched in nitrogen compared with the first permeate stream.

29. The process of claim 28, further comprising recirculating the second permeate stream to step (c).

30. The process of claim 28, further comprising compressing the gas stream prior to step (c).

31. The process of claim 28, wherein the first pressure is in the range 500–1,500 psia.

32. The process of claim 28, further comprising compressing the first permeate stream prior to step (f).

33. The process of claim 28, wherein the third pressure is in the range 500–1,500 psia.

34. The process of claim 28, wherein the second pressure and fourth pressure are at least about 100 psia.

35. The process of claim 28, wherein the gas stream is cooled by heat exchange against the first permeate stream before step (c).

* * * * *